United States Patent
Cheng et al.

(10) Patent No.: US 9,516,545 B2
(45) Date of Patent: Dec. 6, 2016

(54) TRANSMISSION MODE SELECTING METHOD, ANTENNA TRANSMISSION/RECEPTION COMBINATION DETERMINING METHOD, DEVICE AND SYSTEM

(71) Applicant: Huawei Technologies Co., Ltd., Shenzhen, Guangdong (CN)

(72) Inventors: Hong Cheng, Shenzhen (CN); Rui Wang, Shenzhen (CN); Yinggang Du, Kista (SE); Lu Rong, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 152 days.

(21) Appl. No.: 14/539,718

(22) Filed: Nov. 12, 2014

(65) Prior Publication Data
US 2015/0071062 A1    Mar. 12, 2015

Related U.S. Application Data

(63) Continuation of application No. PCT/CN2013/071160, filed on Jan. 30, 2013.

(30) Foreign Application Priority Data

Jun. 27, 2012  (CN) .......................... 2012 1 0214899

(51) Int. Cl.
H04W 28/02    (2009.01)
H04B 7/06     (2006.01)
(Continued)

(52) U.S. Cl.
CPC ....... *H04W 28/0289* (2013.01); *H04B 7/0689* (2013.01); *H04B 7/0871* (2013.01);
(Continued)

(58) Field of Classification Search
CPC ....... H04Q 11/04; H04B 3/32; H04J 3/0682; H04L 12/44; H04L 1/0003
See application file for complete search history.

(56) References Cited

U.S. PATENT DOCUMENTS 7,817,641 B1  10/2010  Khandani
7,957,702 B2   6/2011  Haartsen et al.
(Continued)

FOREIGN PATENT DOCUMENTS

CN    1805305 A    7/2006
CN  101151812 A    3/2008
(Continued)

OTHER PUBLICATIONS

Taneli Riihonen, et al., "Hybrid Full-Duplex/Half-Duplex Relaying with Transmit Power Adaptation", IEEE Transactions on Wireless Communications, vol. 10, No. 9, Sep. 2011, p. 3074-3085.

*Primary Examiner* — Chandrahas Patel

(57) ABSTRACT

Embodiments of the present invention disclose a transmission mode selecting method, an antenna TX/RX combination determining method, device, and system. The transmission mode selecting method includes: obtaining a first system capacity in a half-duplex transmission mode; obtaining a second system capacity in a full-duplex transmission mode, where the second system capacity is the maximum value among system capacities of a universal set of candidate antenna TX/RX combinations in the full-duplex transmission mode, or the maximum value among system capacities of a first subset of the candidate antenna TX/RX combinations in the full-duplex transmission mode, or a system capacity exceeding a system capacity threshold; and selecting a target transmission mode according to a comparison result between the first system capacity and the second system capacity, where the target transmission mode is a transmission mode corresponding to a larger value between the first system capacity and the second system capacity.

16 Claims, 19 Drawing Sheets

(51) Int. Cl.
*H04L 5/14* (2006.01)
*H04B 7/08* (2006.01)
*H04L 1/00* (2006.01)
*H04L 5/16* (2006.01)
*H04W 52/42* (2009.01)
*H04W 52/44* (2009.01)
*H04W 52/50* (2009.01)

(52) U.S. Cl.
CPC .............. *H04L1/0001* (2013.01); *H04L 5/14* (2013.01); *H04L 5/16* (2013.01); *H04W 52/42* (2013.01); *H04W 52/44* (2013.01); *H04W 52/50* (2013.01); *H04B 7/0691* (2013.01); *H04B 7/0874* (2013.01)

(56) References Cited

U.S. PATENT DOCUMENTS

| | | | |
|---|---|---|---|
| 8,462,671 | B2 | 6/2013 | Rinne et al. |
| 9,125,188 | B2 * | 9/2015 | Tamaki .................. H04L 1/1854 |
| 2008/0153431 | A1 | 6/2008 | Haartsen et al. |
| 2009/0190684 | A1 | 7/2009 | She et al. |
| 2010/0202329 | A1 | 8/2010 | Nishioka et al. |
| 2011/0039504 | A1 | 2/2011 | Nguyen et al. |
| 2011/0249596 | A1 | 10/2011 | Ross et al. |
| 2011/0292843 | A1 | 12/2011 | Gan et al. |

FOREIGN PATENT DOCUMENTS

| | | |
|---|---|---|
| CN | 101849380 A | 9/2010 |
| CN | 101997565 A | 3/2011 |
| CN | 102025460 A | 4/2011 |

* cited by examiner

TRANSMISSION MODE SELECTING METHOD, ANTENNA TRANSMISSION/RECEPTION COMBINATION DETERMINING METHOD, DEVICE AND SYSTEM

CROSS-REFERENCE TO RELATED APPLICATIONS

This application is a continuation of International Application No. PCT/CN2013/071160, filed on Jan. 30, 2013, which claims priority to Chinese Patent Application No. 201210214899.8, filed on Jun. 27, 2012, both of which are hereby incorporated by reference in their entireties.

TECHNICAL FIELD

The present invention relates to the field of communications technologies, and in particular, to a transmission mode selecting method, an antenna TRANSMISSION/RECEPTION (TX/RX) combination determining method, device, and system.

BACKGROUND

In radio communications networks, available spectrum resources are becoming fewer and fewer. However, due to popularization of various electronic devices and booming of services transmitted at a high data rate, the required throughput of radio air interfaces exponentially increases. Increasing the spectrum utilization rate of a system is an effective measure for improving the throughput of air interfaces without increasing the spectrum resources.

One measure for improving the spectrum utilization rate is to employ multiple antennas to utilize spatial freedom degree, so as to increase the number of data streams capable of being transmitted on a time-frequency resource. Previously, a multi-antenna system mainly employs the half-duplex MIMO (multiple-input multiple-output, multiple-input multiple-output) spatial multiplexing technology with considering the difficulty in isolating transmission from reception. Currently, the technology of isolating transmission/reception antennas on one communications equipment becomes more and more mature, and the full-duplex technology is gradually applied to multi-antenna radio communications. When a TX channel and an RX channel may be switched over flexibly, one part of antennas in the communications equipment are used for transmission and the other part of the antennas are used for reception, and transmission and reception are implemented on the same time-frequency resource. Therefore, the spectrum utilization rate is improved.

At present, for the full-duplex technology, the TX/RX effect of an antenna on the same time-frequency resource is unsatisfactory, because a currently used circulator has an isolation of merely 20 dB to 30 dB, which fails to meet the signal isolation requirement of full-duplex communications. Therefore, in a present full-duplex system, different antennas are used for transmission and reception respectively, an isolation of 30 dB to 40 dB is achieved in advance by isolating antennas by position, and then self-interference signals are canceled by processing analog and digital signals.

A multi-antenna system in both half-duplex and full-duplex transmission modes may use spatial multiplexing, this helps improve the spectrum utilization rate of a system. In this case, a transmission mode selecting scheme is in urgent need in the art to help the system achieve better performance in current channel conditions and to determine the TX/RX mode of antennas to obtain a better system performance when a multi-antenna communications equipment adopts a full-duplex transmission mode.

SUMMARY

Embodiments of the present invention provide a transmission mode selecting method, and an antenna TX/RX combination determining method, device, and system in a full-duplex transmission mode, aiming to achieve a favorable or optimal system performance in current channel conditions.

The embodiments of the present invention provide the following technical solutions:

In one aspect, an embodiment of the present invention provides a transmission mode selecting method, which includes:
  obtaining a first system capacity in a half-duplex transmission mode;
  obtaining a second system capacity in a full-duplex transmission mode, where the second system capacity is the maximum value among system capacities of a universal set of candidate antenna TX/RX combinations in the full-duplex transmission mode, or the maximum value among system capacities of a first subset of the candidate antenna TX/RX combinations in the full-duplex transmission mode, or a system capacity exceeding a system capacity threshold; and
  selecting a target transmission mode according to a comparison result between the first system capacity and the second system capacity, where the target transmission mode is a transmission mode corresponding to a larger value between the first system capacity and the second system capacity.

Further, an embodiment of the present invention provides a transmission mode selecting device, which includes:
  a first system capacity obtaining unit, configured to obtain a first system capacity in a half-duplex transmission mode;
  a second system capacity obtaining unit, configured to obtain a second system capacity in a full-duplex transmission mode, where the second system capacity is the maximum value among system capacities of a universal set of candidate antenna TX/RX combinations in the full-duplex transmission mode, or the maximum value among system capacities of a first subset of the candidate antenna TX/RX combinations in the full-duplex transmission mode, or a system capacity exceeding a system capacity threshold; and a first transmission mode selecting unit, configured to select a target transmission mode according to a comparison result between the first system capacity output by the first system capacity obtaining unit and the second system capacity output by the second system capacity obtaining unit, where the target transmission mode is a transmission mode corresponding to a larger value between the first system capacity and the second system capacity.

Further, an embodiment of the present invention provides a communications equipment. The communications equipment includes: a plurality of antennas, and a first transmission mode selecting module coupled with the plurality of antennas, where the first transmission mode selecting module is the foregoing transmission mode selecting device.

Further, an embodiment of the present invention provides a radio communications system, including a first communications equipment and a second communications equipment, where the first communications equipment is configured to: when needing to perform data transmission with the second communications equipment, obtain a first system capacity in a half-duplex transmission mode; obtain a second system capacity in a full-duplex transmission mode, where the second system capacity is the maximum value among system capacities of a universal set of candidate antenna TX/RX combinations in the full-duplex transmission mode, or the maximum value among system capacities of a first subset of the candidate antenna TX/RX combinations in the full-duplex transmission mode, or a system capacity exceeding a system capacity threshold; select a target transmission mode according to a comparison result between the first system capacity and the second system capacity, where the target transmission mode is a transmission mode corresponding to a larger value between the first system capacity and the second system capacity; and perform data transmission with the second communications equipment based on the target transmission mode; and the second communications equipment is configured to receive data which is sent from the first communications equipment based on the target transmission mode, and/or, send data to the first communications equipment.

It can be seen from the above that, in the embodiments of the present invention, for a communications equipment in which TX/RX channels may be switched over flexibly on antennas, the following may be implemented: obtaining a first system capacity in a half-duplex transmission mode; obtaining a second system capacity in a full-duplex transmission mode, where the second system capacity is the maximum value among system capacities of a universal set of candidate antenna TX/RX combinations in the full-duplex transmission mode, or the maximum value among system capacities of a first subset of the candidate antenna TX/RX combinations in the full-duplex transmission mode, or a system capacity exceeding a system capacity threshold; and selecting a target transmission mode according to a comparison result between the first system capacity and the second system capacity, where the target transmission mode is a transmission mode corresponding to a larger value between the first system capacity and the second system capacity. That is, in the current channel condition where a multi-antenna system is running, a transmission mode enabling the system capacity to be increased or maximized is selected according to a system capacity increasing or maximizing rule, so as to achieve favorable or optimal system performance in current channel conditions of the system.

In another aspect, an embodiment of the present invention provides another transmission mode selecting method, which includes:

obtaining a first system transmit power in a half-duplex transmission mode;

obtaining a second system transmit power in a full-duplex transmission mode, where the second system transmit power is the minimum value among system transmit powers of a universal set of candidate antenna TX/RX combinations in the full-duplex transmission mode, or the minimum value among system transmit powers of a second subset of the candidate antenna TX/RX combinations in the full-duplex transmission mode, or a system transmit power smaller than a system transmit power threshold; and selecting a target transmission mode according to a comparison result between the first system transmit power and the second system transmit power, where the target transmission mode is a transmission mode corresponding to a smaller value between the first system transmit power and the second system transmit power.

Further, an embodiment of the present invention provides another transmission mode selecting device, which includes:

a first system transmit power obtaining unit, configured to obtain a first system transmit power in a half-duplex transmission mode;

a second system transmit power obtaining unit, configured to obtain a second system transmit power in a full-duplex transmission mode, where the second system transmit power is the minimum value among system transmit powers of a universal set of candidate antenna TX/RX combinations in the full-duplex transmission mode, or the minimum value among system transmit powers of a second subset of the candidate antenna TX/RX combinations in the full-duplex transmission mode, or a system transmit power smaller than a system transmit power threshold; and a second transmission mode selecting unit, configured to select a target transmission mode according to a comparison result between the first system transmit power output by the first system transmit power obtaining unit and the second system transmit power output by the second system transmit power obtaining unit, where the target transmission mode is a transmission mode corresponding to a smaller value between the first system transmit power and the second system transmit power.

Further, an embodiment of the present invention provides a communications equipment. The communications equipment includes: a plurality of antennas, and a second transmission mode selecting module coupled with the plurality of antennas, where the second transmission mode selecting module is the foregoing transmission mode selecting device.

Further, an embodiment of the present invention provides a radio communications system, including a third communications equipment and a fourth communications equipment, where the third communications equipment is configured to: when needing to perform data transmission with a second communications equipment, obtain a first system transmit power in a half-duplex transmission mode; obtain a second system transmit power in a full-duplex transmission mode, where the second system transmit power is the minimum value among system transmit powers of a universal set of candidate antenna TX/RX combinations in the full-duplex transmission mode, or the minimum value among system transmit powers of a second subset of the candidate antenna TX/RX combinations in the full-duplex transmission mode, or a system transmit power smaller than a system transmit power threshold; select a target transmission mode according to a comparison result between the first system transmit power and the second system transmit power, where the target transmission mode is a transmission mode corresponding to a smaller value between the first system transmit power and the second system transmit power; and perform data transmission with the fourth communications equipment based on the target transmission mode; and the fourth communications equipment is configured to receive data which is sent from the third communications equipment based on the target transmission mode, and/or, send data to the third communications equipment.

It can be seen from the above that, in the embodiments of the present invention, for a communications equipment in which TX/RX channels may be switched over flexibly on antennas, the following may be implemented: obtaining a first system transmit power in a half-duplex transmission mode; obtaining a second system transmit power in a full-duplex transmission mode, where the second system transmit power is the minimum value among system transmit powers of a universal set of candidate antenna TX/RX combinations in the full-duplex transmission mode, or the minimum value among system transmit powers of a second subset of the candidate antenna TX/RX combinations in the full-duplex transmission mode, or a system transmit power smaller than a system transmit power threshold; and selecting a target transmission mode based on a comparison result between the first system transmit power and the second system transmit power, where the target transmission mode is a transmission mode corresponding to a smaller value between the first system transmit power and the second system transmit power. That is, in the current channel condition where a multi-antenna system is running, a transmission mode enabling the system transmit power to be decreased or minimized is selected according to a system transmit power decreasing or minimizing rule, so as to achieve favorable or optimal system performance in current channel conditions of the system.

In another aspect, an embodiment of the present invention provides another antenna TX/RX combination determining method in a full-duplex transmission mode, which includes:
  obtaining system performance evaluation values corresponding to a plurality of candidate antenna TX/RX combinations in the full-duplex transmission mode, where the plurality of candidate antenna TX/RX combinations is a universal set of candidate antenna TX/RX combinations in the full-duplex transmission mode, or a third subset of the universal set of candidate antenna TX/RX combinations in the full-duplex transmission mode;
  selecting an optimal performance evaluation value among the system performance evaluation values corresponding to the plurality of candidate antenna TX/RX combinations, or, selecting a target performance evaluation value superior to a system performance threshold among the system performance evaluation values corresponding to the plurality of candidate antenna TX/RX combinations; and
  determining a candidate antenna TX/RX combination corresponding to the optimal performance evaluation value or the target performance evaluation value as an adopted antenna TX/RX combination mode.

Further, an embodiment of the present invention provides an antenna TX/RX combination determining device in a full-duplex transmission mode, which includes:
  a system performance evaluation value obtaining unit, configured to obtain system performance evaluation values corresponding to a plurality of candidate antenna TX/RX combinations in the full-duplex transmission mode, where the plurality of candidate antenna TX/RX combinations is a universal set of candidate antenna TX/RX combinations in the full-duplex transmission mode, or a third subset of the universal set of candidate antenna TX/RX combinations in the full-duplex transmission mode;
  a selecting unit, configured to select an optimal performance evaluation value among the system performance evaluation values corresponding to the plurality of candidate antenna TX/RX combinations and output by the system performance evaluation value obtaining unit, or a target performance evaluation value superior to a system performance threshold among the system performance evaluation values corresponding to the plurality of candidate antenna TX/RX combinations; and
  a determining unit, configured to determine a candidate antenna TX/RX combination corresponding to the optimal performance evaluation value or the target performance evaluation value as an adopted antenna TX/RX combination mode.

Further, an embodiment of the present invention provides a communications equipment. The communications equipment includes: a plurality of antennas, and an antenna TX/RX combination determining module coupled with the plurality of antennas, where the antenna TX/RX combination determining module is the foregoing antenna TX/RX combination determining device in a full-duplex transmission mode.

It can be seen from the above that, in the embodiments of the present invention, for a communications equipment in which TX/RX channels may be switched over flexibly on antennas, if a full-duplex transmission mode is used, the following may be implemented: obtaining system performance evaluation values corresponding to a plurality of candidate antenna TX/RX combinations in the full-duplex transmission mode, where the plurality of candidate antenna TX/RX combinations is a universal set of candidate antenna TX/RX combinations in the full-duplex transmission mode, or a third subset of the universal set of candidate antenna TX/RX combinations in the full-duplex transmission mode; selecting an optimal performance evaluation value among the system performance evaluation values corresponding to the plurality of candidate antenna TX/RX combinations, or, selecting a target performance evaluation value superior to a system performance threshold among the system performance evaluation values corresponding to the plurality of candidate antenna TX/RX combinations; and determining a candidate antenna TX/RX combination corresponding to the optimal performance evaluation value or the target performance evaluation value as an adopted antenna TX/RX combination mode. That is, in the current channel condition where a multi-antenna system is running in the full-duplex transmission mode, an optimal or favorable antenna TX/RX combination in the full-duplex mode is determined according to a system evaluation value improving or optimizing rule, so as to achieve favorable or optimal system performance in current channel conditions of the system.

BRIEF DESCRIPTION OF THE DRAWINGS

To describe the technical solutions in embodiments of the present invention or in the prior art more clearly, the following briefly introduces the accompanying drawings required for describing the embodiments or the prior art. Apparently, the accompanying drawings in the following description show merely some embodiments of the present invention, and a person of ordinary skill in the art may still derive other drawings from the accompanying drawings without creative efforts.

DETAILED DESCRIPTION

Figure 1A:
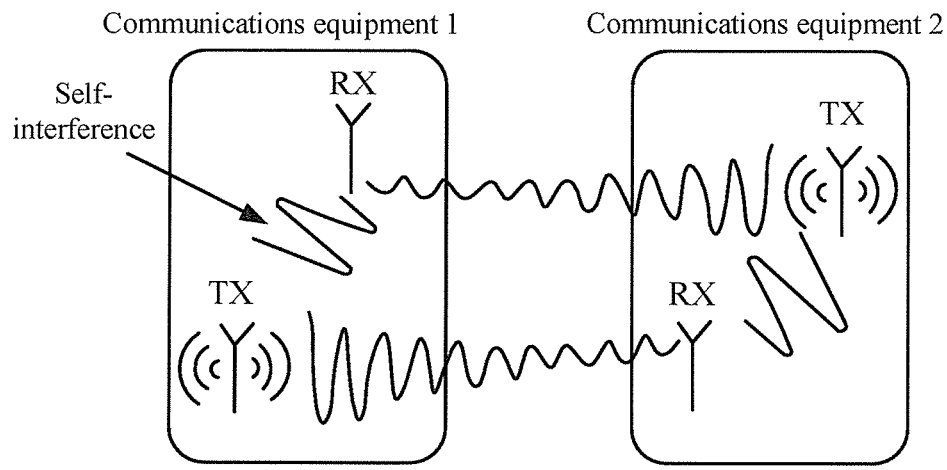
FIG. 1A is a self-interference diagram in a full-duplex transmission mode.

Embodiments of the present invention provide a virtualization processing method and a relevant device, and a computer system, so as to optimize the performance and compatibility of a virtualization system.

To make the solutions of the present invention more comprehensible for a person skilled in the art, the following clearly describes the technical solutions in the embodiments of the present invention with reference to the accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

In order to conveniently understand embodiments of the present invention, several elements that will be introduced in the description of the embodiments of the present invention are illustrated herein first.

Half-Duplex MIMO Transmission Technology

MIMO is applied to both a full-duplex system and a half-duplex system. In a half-duplex transmission mode, all antennas on a communications equipment are used to transmit signals or receive signals; and in a full-duplex output mode, one part of antennas on the communications equipment are used to transmit signals and the other part of antennas on the communications equipment are used to receive signals. It should be understood that in the full-duplex transmission mode, an antenna TX/RX combination needs to be determined. Therefore, the number of unidirectional transmission/reception antennas in the full-duplex transmission mode is smaller than the number of unidirectional transmission/reception antennas in the half-duplex transmission mode.

In the MIMO technology, a plurality of antennas is installed on a receiver and a transmitter, so as to realize the effect of spatial multiplexing (Spatial Multiplexing). Therefore, the degree of freedom in a spatial dimension is introduced. If the channel information is known at both the receiver and the transmitter, the optimal MIMO system is a pre-coding solution based on singular value decomposition.

By using singular value decomposition H=UΛV* on an MIMO channel matrix, MIMO channels may be converted into k parallel channels, where k is the rank of the channel matrix. For a transmission vector, unitary transformation (Precoding) performed by using V, then power amplification and diminishment performed through the k parallel channels, and the transmission vector reaches the receiver after being added with a complex Gaussian noise. At the receiver, k independent signals are obtained after another unitary transformation U* is performed, and then the k signals are demodulated separately. Therefore, the capacity of the MIMO system is obtained in a manner of performing water-filling (water-filling, $$\left(\text{water-filling, } P_i^* = \left(\mu - \frac{N_0}{\lambda_i^2}\right), \sum_i P_i^* = P\right)$$

on a total system transmit power on the parallel channels. This equals to performing transmission on k independent flows (the spatial degree of freedom is of k dimensions), so that the obtained degree of freedom gain is k.

Full-Duplex Technology

A duplex mode is a mode for distinguishing between bi-directional communications links, such as an uplink communications link and a downlink communications link in an operator's mobile network. In the operator's mobile network, a base station (Base station, BS) communicates with a plurality of user equipments (User Equipment, UE) within the coverage area of the base station. The communications between the base station and the user equipments are bidirectional communications, specifically, the process that the base station sends signals to the user equipments is termed downlink communications, and the process that the user equipments send signals to the base station is termed uplink communications.

An existing communications manner includes simplex communications, half-duplex communications, and full-duplex communications, where, the simplex communications are unidirectional communications, a transmitter may merely be used to transmit a signal, a receiver may merely be used to receive a signal, and a signal may merely be sent from the transmitter to the receiver; half-duplex communications are bidirectional communications, but on one transmission resource, only uplink transmission and downlink transmission are performed, and both sides involved in transmission may transmit and receive a signal, but transmission and reception of one transceiver are performed on different transmission resources (time, frequency, and orthogonal code); and in the full-duplex communications, the transceiver performs bidirectional transmission on the same transmission resource.

In a cellular network, communications between the base station and the user equipment are bidirectional communications. The existing cellular communications systems are half-duplex systems. According to different modes for distinguishing an uplink from a downlink on transmission resources, a cellular network is classified into two types, namely frequency division duplexing (Frequency Division Duplexing, FDD) and time division duplexing (Time Division Duplexing, TDD). In a time division duplexing system, the uplink and the downlink use different timeslots for distinguishment, for example, in a long term evolution (Long Term Evolution, LTE) system, a frame is divided into an uplink subframe and a downlink subframe, which are used for uplink transmission and downlink transmission respectively. Generally, in order to avoid interference between the uplink and the downlink, in a time division duplexing system, a protection subframe needs to be added when a downlink subframe is switched over to an uplink subframe (the protection subframe may not be added when the uplink subframe is switched over to the downlink subframe because the base station is capable of controlling the switchover time), so as to maintain synchronization between the entire network. In frequency division duplexing, the uplink and the downlink use different frequency spectrums for distinguishment. Generally, in order to prevent interferences between the uplink and the downlink, a protection frequency band is reserved between the uplink frequency spectrum and the downlink frequency spectrum in a frequency division duplexing system.

In the full-duplex technology, uplink and downlink transmission on the same transmission resources are performed simultaneously. Therefore, the frequency spectrum efficiency is considerably improved. At present, most transceivers employing full-duplex technologies use different antennas and radio frequency channels for transmission and reception because it is still unclear whether the TX/RX isolation effect can be achieved by using the same antennas and radio frequency channels. The full-duplex technology is confronted with the problem of processing interferences to a receive signal caused by a transmit signal on one transceiver. The interference to the receive signal caused by the transmit signal on a local end communications equipment may be called self-interference (self-interference).

The distance between the transmit signal and the receive signal is short (no more than 10 cm in general), so that the transmit signal is received at a high power at the location of the receiver. The strong self-interference must be processed at an analog front end. Otherwise, analog front end congestion occurs (exceeding the linear range of a receive power amplifier and enabling a transmit signal not to reach the quantitative accuracy of an analog-to-digital convertor (Analog-to-Digital Convertor, ADC)). FIG. 1A shows the self-interference in a full-duplex transmission mode. Take a path loss model of a current macro base station as an example, L=128.1+37.6 log 10(R), where the unit of R is km. The path loss from a user equipment 200 m away from the macro base station to the macro base station is 102 dB. The path loss from the transmit signal to the receive signal on one transceiver is 40 dB in general. It can be seen that, even when a user equipment and a base station system employ the same transmit power, the self-interference of the base station is 62 dB stronger than uplink receive signals. The existing self-interference cancellation method involves the following three aspects: antenna, analog, and digital interference cancellation.

Antenna-based interference cancellation includes antenna interference offset and vector space-based interference avoidance. One simple model for antenna interference cancellation is that a transceiver has two TX antennas and one RX antenna. Transmit signals in the same waveform are transmitted on the two transmit antennas. The difference between the distance from one transmit antenna to the receive antenna and that from the other transmit antenna to the receive antenna is half a wavelength (calculated at carrier frequency). After signals transmitted on the two transmit antennas reach the receive antenna, the phase difference is π. Therefore, signals are offset reversely. In this case, the amplitudes of the two transmit signals need to be adjusted to ensure that the amplitudes of the two transmit signals are the same when the transmit signals reach the RX antenna. Antenna interference cancellation is applicable only to narrow band signals because the phase differences of different frequency bands are different and phases of wideband signals may not be aligned with each other within a full band strictly. Besides, the interference signal cancellation result is sensitive to the amplitudes and phases of two received transmit signals, and the amplitudes and phases may not be aligned with each other absolutely and ideally in practice. Vector space-based interference avoidance refers to that at the RX antenna (array), interference signal space and receive signal space are null space (null space) to each other. This requires that the number of TX antennas is no less than the total number of RX antennas of a local end communications equipment and RX antennas of another communications equipment (also may be called a transceiver Transceiver). Supposing that the number of TX antennas is 2M, both the number of RX antennas of the local end communications equipment and that of RX antennas of the peer end communications equipment are M, and the channel matrix from local TX antennas to local RX antennas is $H_{1,1}$. Then, according to the quality of null space mapping, the precoding matrix $P_{1,1}$ for local transmission needs to meet the following condition: $H_{1,1}P_{1,1}=0$.

An analog interference cancellation method refers to that before an analog signal formed in a TX channel is coupled back to the analog front end of a local receive module through a device such as a coil, local self-interference signals in receive signals are subtracted away in analog domain. For a better interference cancellation effect in the analog domain, channel coefficient and channel delay from a local transmit signal to a receive signal need to be estimated because the analog signal coupled at the TX front end needs to pass an attenuator consistent with the channel coefficient and a delay device consistent with the channel delay.

A digital interference cancellation method refers to that after a receive signal passes through an analog-to-digital convertor (Analog-to-Digital Convertor, ADC), a digital filter is used to further cancel remaining self-interference signals. Pure digital domain interference cancellation has the defect that only linear interference can be canceled and non-linear interference caused by an amplifier cannot be canceled.

In a practical full-duplex system, the power of self-interference is high, so that a low-noise amplifier at the RX end may be blocked. Therefore, antenna interference cancellation at the analog front end or interference cancellation in the analog domain is necessary. Because the difference between the power of self-interference signals and that of receive signals are greater than 60 dB in general, a better interference cancellation effect may not be obtained by using only one method. Therefore, the antenna interference cancellation, analog interference cancellation, and digital interference cancellation are always combined.

The embodiments of the present invention are described below with reference to the accompanying drawings.

Figure 1B:
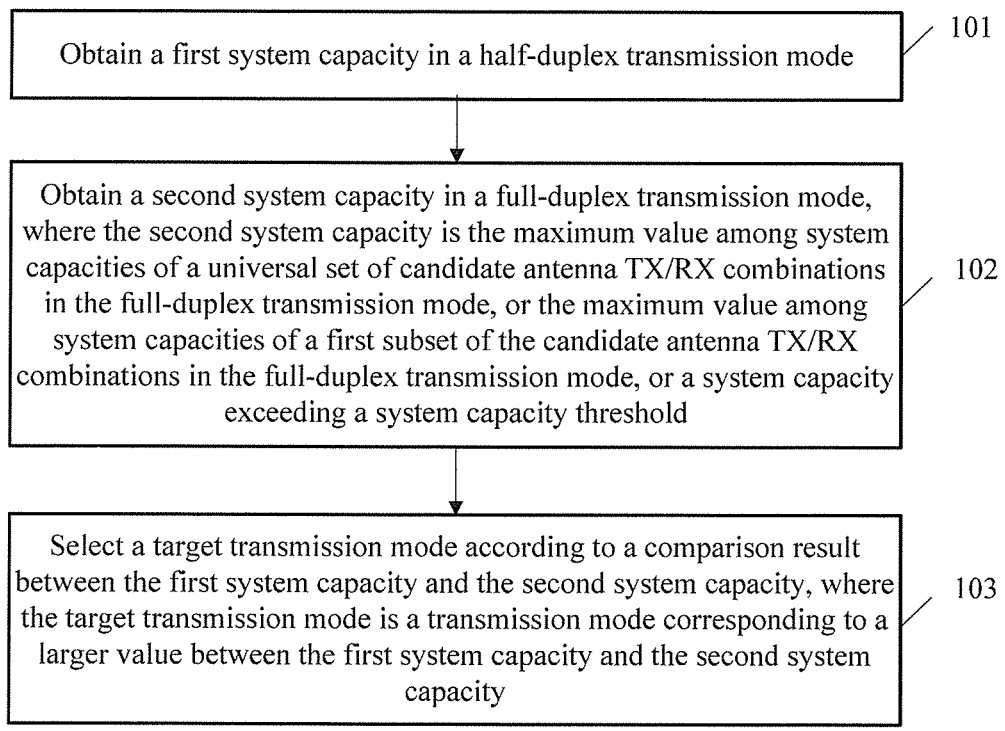
FIG. 1B is a schematic flowchart of a transmission mode selecting method according to an embodiment of the present invention.

Refer to FIG. 1B, which is a transmission mode selecting method according to an embodiment of the present invention. It should be noted that an executive body of the method according to the embodiment of the present invention is a communications equipment, which may also be called a transceiver. It should be understood that a system capacity mentioned below in the embodiment refers to the total of bidirectional capacities of the communications equipment. The method may include:

Step 101: Obtain a first system capacity in a half-duplex transmission mode.

Step 102: Obtain a second system capacity in a full-duplex transmission mode, where the second system capacity is the maximum value among system capacities of a universal set of candidate antenna TX/RX combinations in the full-duplex transmission mode, or the maximum value among system capacities of a first subset of the candidate antenna TX/RX combinations in the full-duplex transmission mode, or a system capacity exceeding a system capacity threshold.

In different implementation manners, the system capacity threshold is the first system capacity, or the system capacity threshold is the sum of the first system capacity and an adjustment value, or the system capacity threshold is an average system capacity or the highest system capacity in a full-duplex transmission mode in a history statistical period, or the system capacity threshold is an average system capacity or the highest system capacity in a half-duplex transmission mode in the history statistical period. It should be understood that the system capacity threshold may be configured flexibly according to a practical application scenario.

It should be understood that the candidate antenna TX/RX combination in the embodiment of the present invention, just as its name implies, is a combination mode indicating: for a local end communications equipment provided with a plurality of antennas and a peer end communications equipment provided with a plurality of antennas, which antennas of the local end communications equipment are used for transmitting signals and which antennas are used for receiving signals, and which antennas of the peer end communications equipment are used for transmitting signals and which antennas are used for receiving signals.

Step 103: Select a target transmission mode according to a comparison result between the first system capacity and the second system capacity, where the target transmission mode is a transmission mode corresponding to a larger value between the first system capacity and the second system capacity.

In an implementation mode, step 103 may include:
  if the second system capacity is greater than the first system capacity, selecting the full-duplex transmission mode; and
  if the second system capacity is smaller than the first system capacity, selecting the half-duplex transmission mode.

It should be understood that if the second system capacity is equal to the first system capacity, either of the transmission modes can be selected randomly, or it is determined, by further considering other factors, which transmission mode is selected.

Figure 1C:
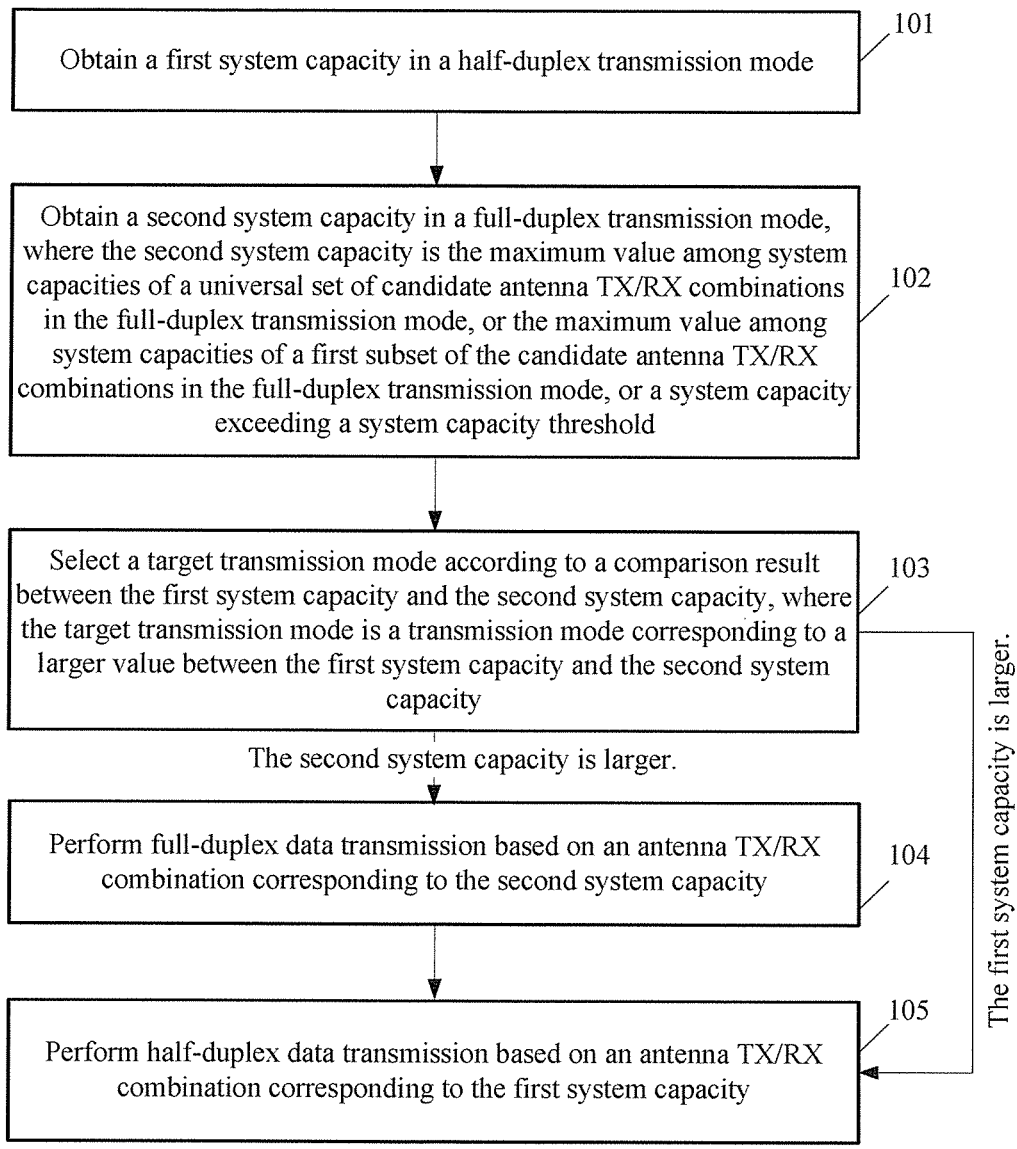
FIG. 1C is a schematic flowchart of another transmission mode selecting method according to an embodiment of the present invention.

This method is applied to a radio communications system including a first communications equipment provided with M antennas and a second communications equipment provided with N antennas, where M and N are integral numbers greater than 1. If the second system capacity is larger, the target transmission mode is the full-duplex transmission mode. As shown in FIG. 1C, the method further includes:

Step 104: Perform full-duplex data transmission based on an antenna TX/RX combination corresponding to the second system capacity, where the antenna TX/RX combination corresponding to the second system capacity refers to a transmission mode of each antenna among M antennas on the first communications equipment, and a transmission mode of each antenna among N antennas on the second communications equipment when the full-duplex transmission mode is used for transmission. The transmission mode of the antenna is receiving signals or transmitting signals optionally, where the second communications equipment provided with the N antennas is a single communications equipment, or a set of a plurality of communications equipments.

If the first system capacity is larger, the target transmission mode is the half-duplex transmission mode. As shown in FIG. 1C, the method further includes:

Step 105: Perform half-duplex data transmission based on an antenna TX/RX combination corresponding to the first system capacity.

It should be understood that the candidate antenna TX/RX combination determined to be adopted among a plurality of candidate antenna TX/RX combinations may be directly described as an antenna TX/RX combination.

Preferably, in order to balance system performance and data calculation cost, the method further includes:
    calculating system capacities corresponding to a plurality of candidate antenna TX/RX combinations in the full-duplex transmission mode within a first calculation period threshold.

The plurality of candidate antenna TX/RX combinations corresponding to which the system capacities are calculated in the full-duplex transmission mode within the first calculation period threshold forms the first subset.

It should be understood that, without considering the calculation cost, the method further includes: calculating system capacities corresponding to all candidate antenna TX/RX combinations in the full-duplex transmission mode.

Preferably, the system capacity corresponding to one antenna TX/RX combination in the full-duplex transmission mode is calculated by using the following method:
    dividing a channel matrix of a system into 4 sub-matrices based on each matrix division mode among S matrix division modes for the channel matrix of the system, or dividing a channel matrix converted from the channel matrix of the system into 4 sub-matrices based on each matrix division mode among S matrix division modes for the channel matrix converted from the channel matrix of the system;
    selecting two sub-matrices on a principal diagonal and two sub-matrices on a counter diagonal, and calculating a first system capacity candidate value based on the two sub-matrices on the principal diagonal and a second system capacity candidate value based on the two sub-matrices on the counter diagonal; and
    determining a larger value between the first system capacity candidate value and the second system capacity candidate value as a system capacity corresponding to a current matrix division mode.

S is a universal set of all matrix division modes for the channel matrix of the system or the channel matrix converted from the channel matrix of the system, or a first subset of the universal set of all matrix division modes for the channel matrix of the system or the channel matrix converted from the channel matrix of the system.

Each matrix division mode among the S matrix division modes for the channel matrix of the system corresponds to a candidate antenna TX/RX combination, or each matrix division mode among the S matrix division modes for the channel matrix converted from the channel matrix of the system corresponds to a candidate antenna TX/RX combination, and S matrix division modes correspond to S different candidate antenna TX/RX combinations. It should be noted that the matrix mentioned here may be an original channel matrix, and also may be a converted channel matrix, where, S is an integral number greater than or equal to 1.

It should be noted that for the channel matrix converted from the channel matrix of the system in the embodiment of the present invention, the matrix conversion method may be: in the matrix, changing the sequence of row vectors in the matrix and/or changing the sequence of column vectors in the matrix.

Further, in the embodiment of the present invention, this method is applied to a radio communications system including a second communications equipment and a first communications equipment provided with M antennas.

If the second communications equipment is a communications equipment provided with N antennas, the channel matrix of the system refers to: an M×N channel matrix formed by channel responses between each antenna of the first communications equipment provided with M antennas and each antenna of the second communications equipment provided with N antennas, where the element in row i, column j indicates the channel response between the $i^{th}$ antenna of the first communications equipment and the $j^{th}$ antenna of the second communications equipment.

If the second communications equipment is a set of a plurality of communications equipments and the set of the plurality of communications equipments includes N antennas, the channel matrix of the system refers to: an M×N channel matrix formed by channel response between each antenna of the first communications equipment provided with M antennas and each antenna among the N antennas included in the set of the plurality of communications equipments, where the element in row i, column j indicates the channel response between the $i^{th}$ antenna of the first communications equipment and the $j^{th}$ antenna of the set of the plurality of communications equipments.

M and N are positive integral numbers greater than 1.

In other words, if the second communications equipment is a set of a plurality of communications equipments, the channel matrix of the system regards all antennas in the second communications equipment as a whole, and is a combined channel matrix.

With regard to the transmission mode selection between two multi-antenna communications equipments, the channel matrix is a channel matrix between the two equipments. With regard to selecting an equipment among a plurality of communications equipments to communicate with a single multi-antenna communications equipment, the channel matrix is a combined channel matrix between the single communications equipment and the plurality of communications equipments. In the combined channel matrix, the plurality of communications equipments are regarded as a whole communications equipment, and each communications equipment among the plurality of communications equipments may be provided with one or more antennas.

It can be seen from the above that, in the embodiment of the present invention, for a communications equipment in which TX/RX channels may be switched over flexibly on antennas, the following may be implemented: obtaining a first system capacity in a half-duplex transmission mode; obtaining a second system capacity in a full-duplex transmission mode, where the second system capacity is the maximum value among system capacities of a universal set of candidate antenna TX/RX combinations in the full-duplex transmission mode, or the maximum value among system capacities of a first subset of the candidate antenna TX/RX combinations in the full-duplex transmission mode, or a system capacity exceeding a system capacity threshold; and selecting a target transmission mode according to a comparison result between the first system capacity and the second system capacity, where the target transmission mode is a transmission mode corresponding to a larger value between the first system capacity and the second system capacity. That is, in the current channel condition where a multi-antenna system is running, a transmission mode enabling the system capacity to be increased or maximized is selected according to a system capacity increasing or maximizing rule, so as to achieve favorable or optimal system performance in current channel conditions of the system.

Figure 2A:
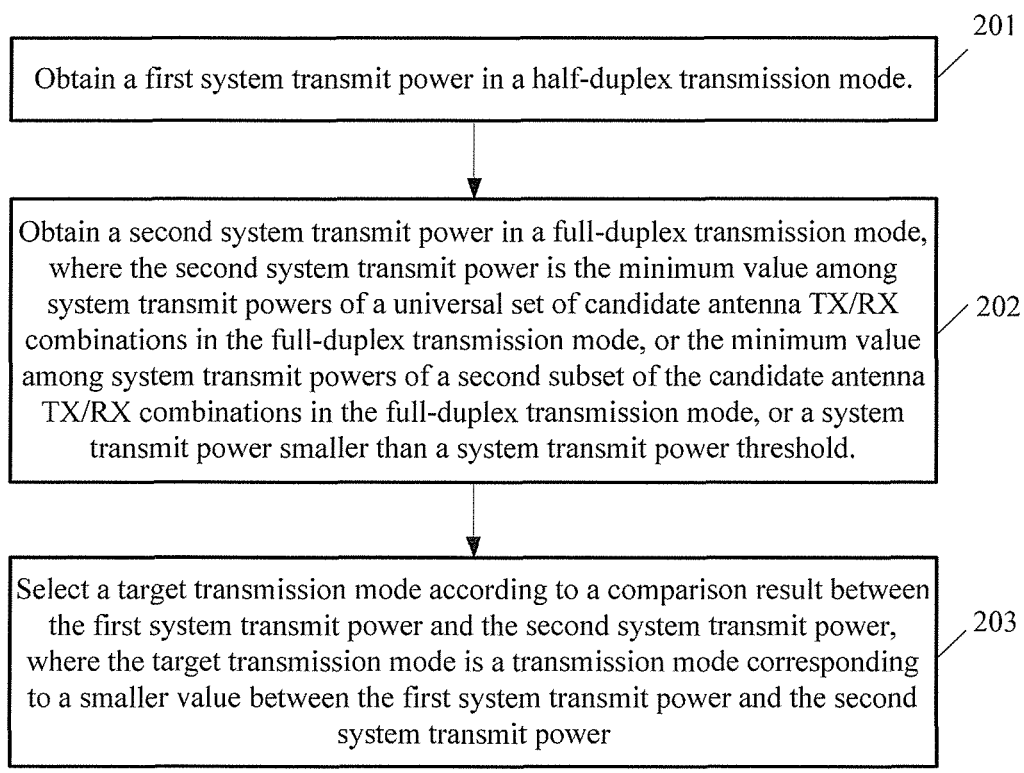
FIG. 2A is a schematic flowchart of still another transmission mode selecting method according to an embodiment of the present invention.

Refer to FIG. 2A, which is another transmission mode selecting method according to an embodiment of the present invention. The method may be applied to a communications equipment, which may also be called a transceiver. It should be understood that the system transmit power mentioned below in this embodiment refers to the sum of transmit powers of the communications equipment. The method may include:

Step 201: Obtain a first system transmit power in a half-duplex transmission mode.

Step 202: Obtain a second system transmit power in a full-duplex transmission mode, where the second system transmit power is the minimum value among system transmit powers of a universal set of candidate antenna TX/RX combinations in the full-duplex transmission mode, or the minimum value among system transmit powers of a second subset of the candidate antenna TX/RX combinations in the full-duplex transmission mode, or a system transmit power smaller than a system transmit power threshold.

In different implementation manners, the system transmit power threshold is the first system transmit power, or the system transmit power threshold is the difference between the first system transmit power and an adjustment value, or the system transmit power threshold is an average system transmit power or the lowest system transmit power in a full-duplex transmission mode in a history statistical period, or the system transmit power threshold is an average system transmit power or the lowest system transmit power in a half-duplex transmission mode in the history statistical period.

It should be understood that the system transmit power threshold may be configured flexibly according to a practical application scenario.

It should be understood that the candidate antenna TX/RX combination in the embodiment of the present invention, just as its name implies, is a combination mode indicating: for a local end communications equipment provided with a plurality of antennas and a peer end communications equipment provided with a plurality of antennas, which antennas of the local end communications equipment are used for transmitting signals and which antennas are used for receiving signals, and which antennas of the peer end communications equipment are used for transmitting signals and which antennas are used for receiving signals.

Step 203: Select a target transmission mode according to a comparison result between the first system transmit power and the second system transmit power, where the target transmission mode is a transmission mode corresponding to a smaller value between the first system transmit power and the second system transmit power.

In an implementation mode, step 203 may include:
if the second system transmit power is smaller than the first system transmit power, selecting the full-duplex transmission mode; and if the second system transmit power is greater than the first system transmit power, selecting the half-duplex transmission mode.

It should be understood that if the second system transmit power is equal to the first system transmit power, either of the transmission modes can be selected randomly, or it is determined, by further considering other factors, which transmission mode is selected.

Figure 2B:
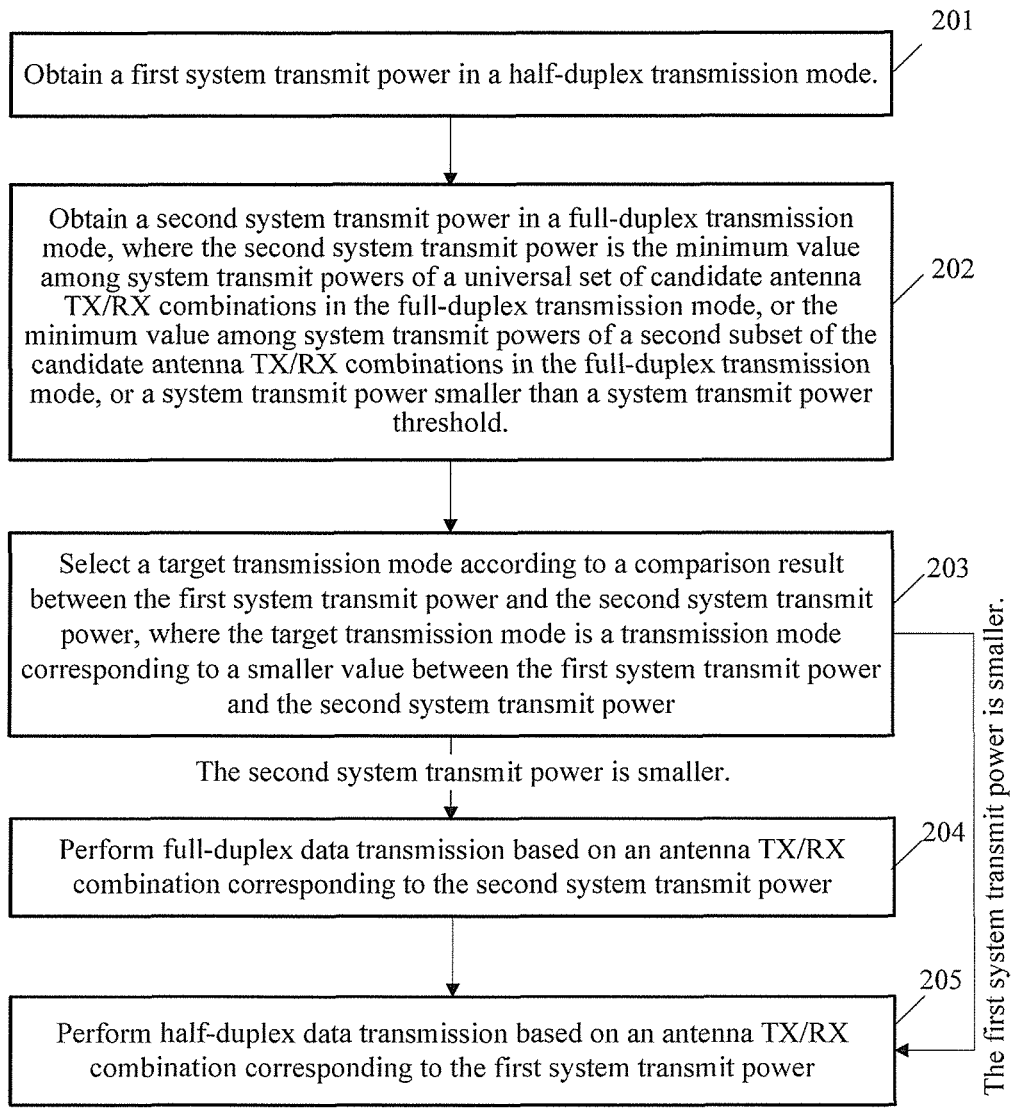
FIG. 2B is a schematic flowchart of yet another transmission mode selecting method according to an embodiment of the present invention.

When this method is applied to a radio communications system including a first communications equipment provided with M antennas and a second communications equipment provided with N antennas, where M and N are integral numbers greater than 1, as shown in FIG. 2B, if the second system transmit power is smaller, the target transmission mode is the full-duplex transmission mode. The method further includes:

Step 204: Perform full-duplex data transmission based on an antenna TX/RX combination corresponding to the second system transmit power, where the antenna TX/RX combination corresponding to the second system transmit power refers to a transmission mode of each antenna among M antennas on the first communications equipment, and a transmission mode of each antenna among N antennas on the second communications equipment when the full-duplex transmission mode is used for transmission. The transmission mode of the antenna is receiving signals or transmitting signals optionally, where the second communications equipment provided with the N antennas is a single communications equipment, or a set of a plurality of communications equipments.

If the first system transmit power is smaller, the target transmission mode is the half-duplex transmission mode. The method further includes:

Step 205: Perform half-duplex data transmission based on an antenna TX/RX combination corresponding to the first system transmit power.

Preferably, in order to balance system performance and data calculation cost, the method further includes:
calculating system transmit powers corresponding to a plurality of candidate antenna TX/RX combinations in the full-duplex transmission mode within a second calculation period threshold;

The plurality of candidate antenna TX/RX combinations corresponding to which the system transmit powers are calculated in the full-duplex transmission mode within the second calculation period threshold forms the second subset.

It should be understood that, without considering the calculation cost, the method further includes: calculating system transmit powers corresponding to all candidate antenna TX/RX combinations in the full-duplex transmission mode.

Preferably, in an implementation mode, the system transmit power corresponding to one antenna TX/RX combination in the full-duplex transmission mode is calculated by using the following method:
dividing a channel matrix of a system into 4 sub-matrices based on each matrix division mode among S matrix division modes for the channel matrix of the system, or dividing a channel matrix converted from the channel matrix of the system into 4 sub-matrices based on each matrix division mode among S matrix division modes for the channel matrix converted from the channel matrix of the system;

selecting two sub-matrices on a principal diagonal and two sub-matrices on a counter diagonal, and calculating a first system transmit power candidate value based on the two sub-matrices on the principal diagonal and a second system transmit power candidate value based on the two sub-matrices on the counter diagonal; and determining a smaller value between the first system transmit power candidate value and the second system transmit power candidate value as a system transmit power corresponding to a current matrix division mode.

S is a universal set of all matrix division modes for the channel matrix of the system or the channel matrix converted from the channel matrix of the system, or a second subset of the universal set of all matrix division modes for the channel matrix of the system or the channel matrix converted from the channel matrix of the system.

Each matrix division mode among the S matrix division modes for the channel matrix of the system corresponds to a candidate antenna TX/RX combination, or each matrix division mode among the S matrix division modes for the channel matrix converted from the channel matrix of the system corresponds to a candidate antenna TX/RX combination, and S matrix division modes correspond to S different candidate antenna TX/RX combinations. It should be noted that the matrix mentioned here may be an original channel matrix, and also may be a converted channel matrix, where, S is an integral number greater than or equal to 1.

It can be seen from the above that, in the embodiment of the present invention, for a communications equipment in which TX/RX channels may be switched over flexibly on antennas, the following may be implemented: obtaining a first system transmit power in a half-duplex transmission mode; obtaining a second system transmit power in a full-duplex transmission mode, where the second system transmit power is the minimum value among system transmit powers of a universal set of candidate antenna TX/RX combinations in the full-duplex transmission mode, or the minimum value among system transmit powers of a second subset of the candidate antenna TX/RX combinations in the full-duplex transmission mode, or a system transmit power smaller than a system transmit power threshold; and selecting a target transmission mode according to a comparison result between the first system transmit power and the second system transmit power, where the target transmission mode is a transmission mode corresponding to a smaller value between the first system transmit power and the second system transmit power. That is, in the current channel condition where a multi-antenna system is running, a transmission mode enabling the system transmit power to be decreased or minimized is selected according to a system transmit power decreasing or minimizing rule, so as to achieve favorable or optimal system performance in current channel conditions of the system.

Figure 3:
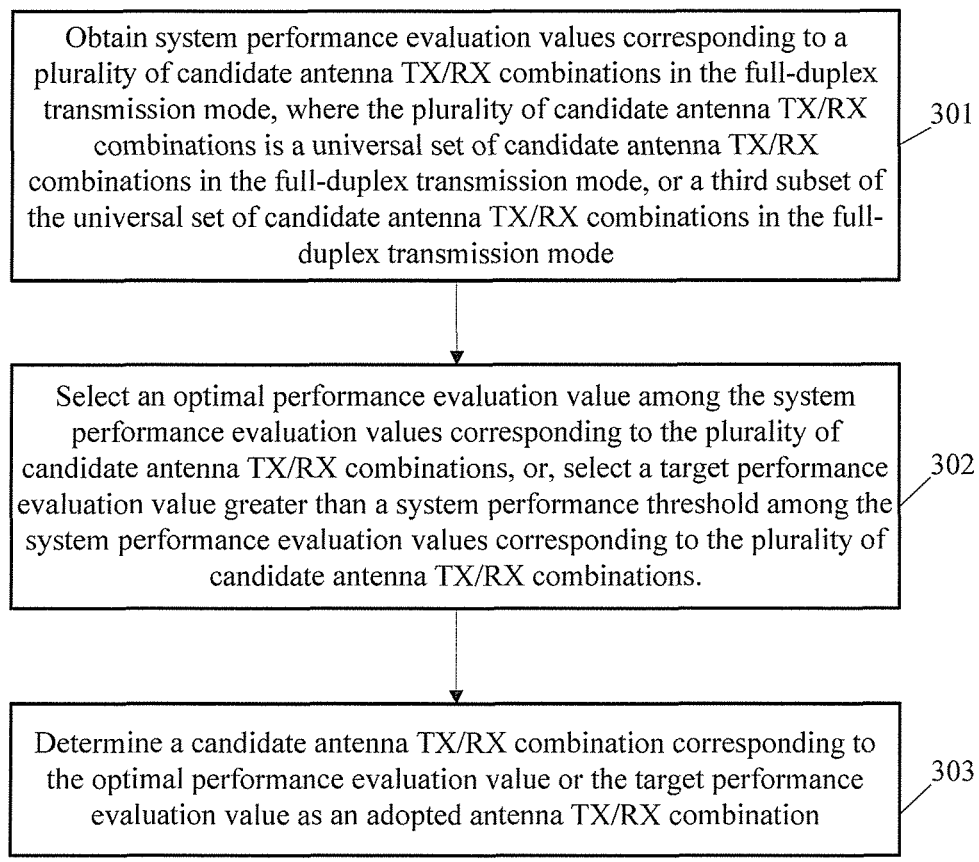
FIG. 3 is a schematic flowchart of an antenna TX/RX combination determining method in a full-duplex transmission mode according to an embodiment of the present invention.

Refer to FIG. 3, which is an antenna TX/RX combination determining method in a full-duplex transmission mode according to an embodiment of the present invention, which may be applied to a communications equipment, and the method may include:

Step 301: Obtain system performance evaluation values corresponding to a plurality of candidate antenna TX/RX combinations in the full-duplex transmission mode, where the plurality of candidate antenna TX/RX combinations is a universal set of candidate antenna TX/RX combinations in the full-duplex transmission mode, or a third subset of the universal set of candidate antenna TX/RX combinations in the full-duplex transmission mode.

Step 302: Select an optimal performance evaluation value among the system performance evaluation values corresponding to the plurality of candidate antenna TX/RX combinations, or, select a target performance evaluation value superior to a system performance threshold among the system performance evaluation values corresponding to the plurality of candidate antenna TX/RX combinations.

It should be understood that in different implementation manners, a system performance evaluation index may be a system capacity or a system transmit power or another index. Correspondingly, it should be understood that the system performance evaluation value herein may be a system capacity, a system transmit power, and various indexes capable of evaluating system performance.

Correspondingly, for different performance evaluation indexes, the "optimal" mentioned in step 302 may be the largest value, a larger value, or a value greater than a target performance evaluation value (such as a system capacity), or the smallest value, a smaller value, or a value smaller than the target performance evaluation value (such as a system transmit power).

Step 303: Determine a candidate antenna TX/RX combination corresponding to the optimal performance evaluation value or the target performance evaluation value as an adopted antenna TX/RX combination mode.

In one implementation mode, the step 301 may include: calculating system capacities corresponding to all candidate antenna TX/RX combinations in the full-duplex transmission mode, where all the candidate antenna TX/RX combinations in the full-duplex transmission mode form a universal set; or, within a first calculation period threshold, calculating system capacities corresponding to a plurality of candidate antenna TX/RX combinations in the full-duplex transmission mode, where the plurality of candidate antenna TX/RX combinations corresponding to which the system capacities are calculated in the full-duplex transmission mode within a first calculation period threshold forms the third subset.

Correspondingly, the step 302 may include: selecting the maximum system capacity among the system capacities corresponding to the plurality of candidate antenna TX/RX combinations, or, selecting a target system capacity greater than a system capacity threshold among the system capacities corresponding to the plurality of candidate antenna TX/RX combinations.

Correspondingly, the step 303 may include: determining a candidate antenna TX/RX combination corresponding to the maximum system capacity or a target system capacity as the adopted antenna TX/RX combination mode.

Specifically, in an implementation mode, the calculating the system capacity corresponding to one antenna TX/RX combination in the full-duplex transmission mode includes:

dividing a channel matrix of a system into 4 sub-matrices based on each matrix division mode among S matrix division modes for the channel matrix of the system, or dividing a channel matrix converted from the channel matrix of the system into 4 sub-matrices based on each matrix division mode among S matrix division modes for the channel matrix converted from the channel matrix of the system;

selecting two sub-matrices on a principal diagonal and two sub-matrices on a counter diagonal, and calculating a first system capacity candidate value based on the two sub-matrices on the principal diagonal and a second system capacity candidate value based on the two sub-matrices on the counter diagonal; and determining a larger value between the first system capacity candidate value and the second system capacity candidate value as a system capacity corresponding to a current matrix division mode.

S is a universal set of all matrix division modes for the channel matrix of the system or the channel matrix converted from the channel matrix of the system, or a third subset of the universal set of all matrix division modes for the channel matrix of the system or the channel matrix converted from the channel matrix of the system.

Each matrix division mode among the S matrix division modes for the channel matrix of the system corresponds to a candidate antenna TX/RX combination, or each matrix division mode among the S matrix division modes for the channel matrix converted from the channel matrix of the system corresponds to a candidate antenna TX/RX combination, and S matrix division modes correspond to S different candidate antenna TX/RX combinations. It should be noted that the matrix mentioned here may be an original channel matrix, and also may be a converted channel matrix, where S is an integral number greater than or equal to 1.

In another implementation mode, step 301 may include: calculating system transmit powers corresponding to all candidate antenna TX/RX combinations in the full-duplex transmission mode, where all the candidate antenna TX/RX combinations in the full-duplex transmission mode form the universal set; or, within a second calculation period threshold, calculating system transmit powers corresponding to a plurality of candidate antenna TX/RX combinations in the full-duplex transmission mode, where the plurality of candidate antenna TX/RX combinations corresponding to which the system transmit powers are calculated in the full-duplex transmission mode within a second calculation period threshold forms the third subset. It should be noted that the second calculation period threshold may be configured flexibly according to a practical application scenario.

Correspondingly, step 302 may include: selecting the minimum system transmit power among the system transmit powers corresponding to all the candidate antenna TX/RX combinations, or, selecting a target system transmit power smaller than a system transmit power threshold among system transmit powers corresponding to a plurality of candidate antenna TX/RX combinations. It should be understood that the system transmit power threshold may be configured flexibly according to a practical application scenario.

Correspondingly, the step 303 may include: determining a candidate antenna TX/RX combination corresponding to the minimum system transmit power or the target system transmit power as the adopted antenna TX/RX combination mode.

Specifically, in an implementation mode, the calculating the system transmit power corresponding to one antenna TX/RX combination in the full-duplex transmission mode includes:

dividing a channel matrix of a system into 4 sub-matrices based on each matrix division mode among S matrix division modes for the channel matrix of the system, or dividing a channel matrix converted from the channel matrix of the system into 4 sub-matrices based on each matrix division mode among S matrix division modes for the channel matrix converted from the channel matrix of the system;

selecting two sub-matrices on a principal diagonal and two sub-matrices on a counter diagonal, and calculating a first system transmit power candidate value based on the two sub-matrices on the principal diagonal and a second system transmit power candidate value based on the two sub-matrices on the counter diagonal; and determining a smaller value between the first system transmit power candidate value and the second system transmit power candidate value as a system transmit power corresponding to a current matrix division mode.

S is a universal set of all matrix division modes for the channel matrix of the system or the channel matrix converted from the channel matrix of the system, or a third subset of the universal set of all matrix division modes for the channel matrix of the system or the channel matrix converted from the channel matrix of the system.

Each matrix division mode among the S matrix division modes for the channel matrix of the system corresponds to a candidate antenna TX/RX combination, or each matrix division mode among the S matrix division modes for the channel matrix converted from the channel matrix of the system corresponds to a candidate antenna TX/RX combination, and S matrix division modes correspond to S different candidate antenna TX/RX combinations. It should be noted that the matrix mentioned here may be an original channel matrix, and also may be a converted channel matrix, where, S is an integral number greater than or equal to 1.

It should be noted that if all antennas of a communications equipment select a TX mode, or all antenna of the communications equipment select an RX mode, the communications equipment works in a half-duplex mode. If two full-duplex multi-antenna equipments communicate with each other, all antennas select the TX mode or the RX mode, in this case, the system works in a half-duplex mode. When system implementation differences between half-duplex and full-duplex antenna TX/RX combinations are not considered, the half-duplex mode is regarded as an antenna TX/RX combination and used with antenna TX/RX combinations in the full-duplex mode for calculating the system performance evaluation value, to determine a mode (which may be one antenna TX/RX combination in the half-duplex mode or the full-duplex mode) corresponding to an optimal or favorable performance for data transmission. When the system performance evaluation value is calculated, in the half-duplex mode, a matrix is not converted and divided, and the unidirectional transmission performance calculated according to the channel matrix represents the system performance.

It can be seen from the above that, in the embodiment of the present invention, for a communications equipment in which TX/RX channels may be switched over flexibly on antennas, if a full-duplex transmission mode is used, the following may be implemented: obtaining system performance evaluation values corresponding to a plurality of candidate antenna TX/RX combinations in the full-duplex transmission mode, where the plurality of candidate antenna TX/RX combinations is a universal set of candidate antenna TX/RX combinations in the full-duplex transmission mode, or a third subset of the universal set of candidate antenna TX/RX combinations in the full-duplex transmission mode; selecting an optimal performance evaluation value among the system performance evaluation values corresponding to the plurality of candidate antenna TX/RX combinations, or, selecting a target performance evaluation value superior to a system performance threshold among the system performance evaluation values corresponding to the plurality of candidate antenna TX/RX combinations; and determining a candidate antenna TX/RX combination corresponding to the optimal performance evaluation value or the target performance evaluation value as an adopted antenna TX/RX combination mode. That is, in the current channel condition where a multi-antenna system is running in the full-duplex transmission mode, an optimal or favorable antenna TX/RX combination in the full-duplex transmission mode is determined according to a system evaluation value improving or optimizing rule, so as to achieve favorable or optimal system performance in current channel conditions of the system.

The following introduces the transmission mode selecting method according to the present invention with reference to specific embodiments. To facilitate description, in the following embodiments, suppose that a channel between two communications equipments is a complex Gaussian channel experiencing Rayleigh (Rayleigh) fading. A self-interference channel is a Rician (Rician) channel with a large K (K is a parameter for a Rician channel), that is, a complex Gaussian channel with a large average value.

1. A Transmission Mode Selecting Method Based on System Capacity Optimization

In the embodiment of the present invention, a communications equipment provided with two antennas is taken as an example. It should be understood that, according to implementation manners described below, a person of ordinary skill in the art may derive a condition where a communications equipment is provided with more than two antennas.

The communications equipment provided with two antennas may employ half-duplex transmission to send two data streams through unidirectional spatial multiplexing, also may employ full-duplex transmission in which one antenna is used for transmitting and another antenna is used for receiving, in this case, each communications equipment receives a data flow and transmits a data flow at the same time, therefore there are also two data streams.

Figure 4:
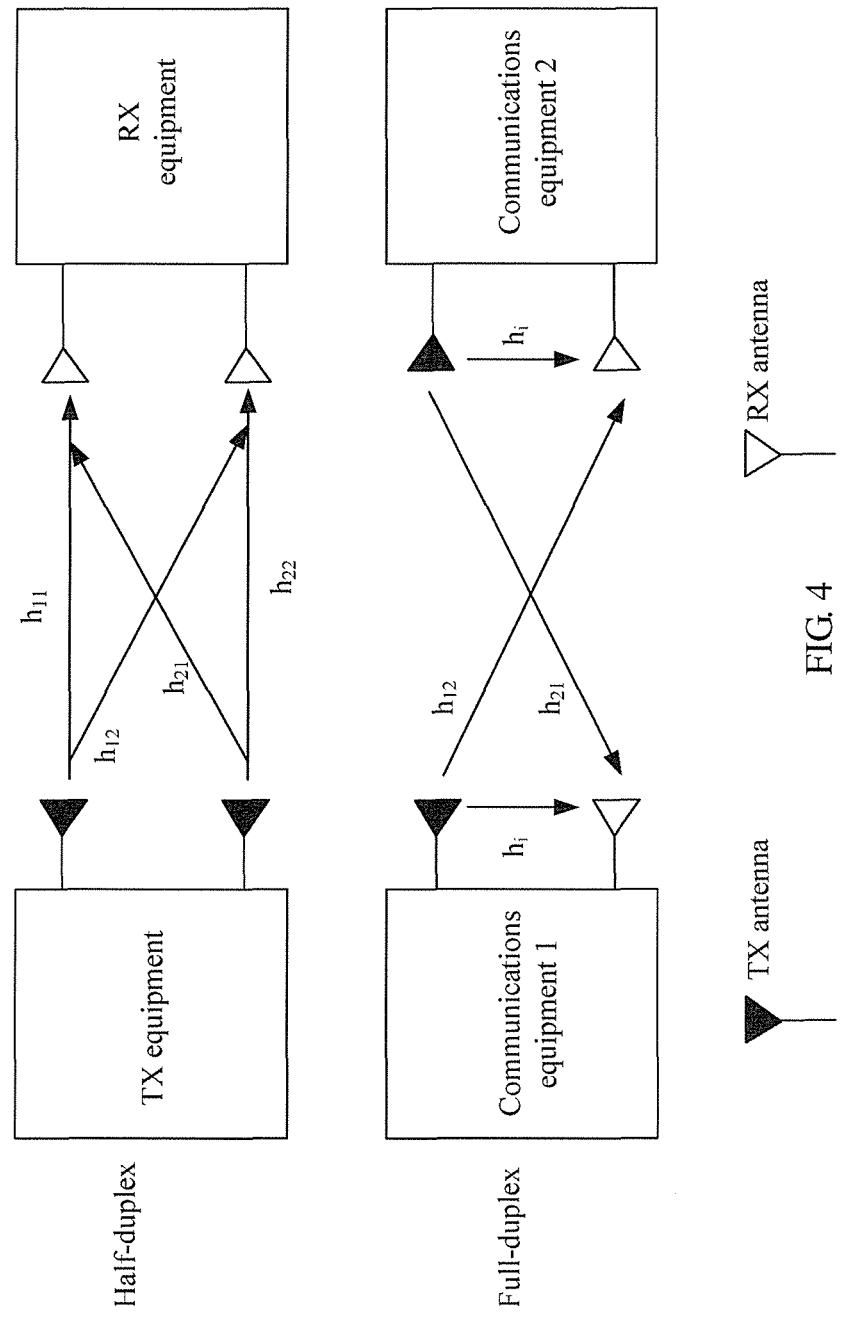
FIG. 4 is a schematic diagram of two transmission modes between a local end communications equipment provided with two antennas and a peer end communications equipment provided with two antennas.

FIG. 4 is a schematic diagram of two transmission modes between a local end communications equipment provided with two antennas and a peer end communications equipment provided with two antennas. The following analyzes, in typical complex Gaussian channel conditions, how to determine, according to a channel matrix, which transmission mode brings a higher system capacity.

To analyze system capacity, at first, the channels of a full-duplex communications equipment after interference is canceled are modeled. Supposing the channel response of a self-interference channel is $h_i$, the channel response between two communications equipments is $h_s$, a transmit signal of the local end communications equipment is x, and a transmit signal of the peer end communications equipment is s, a receive signal received by a receiving antenna on the local end communications equipment is:

$$y_r = h_i x + h_s s + n$$

where, n is an additive complex Gaussian noise, $h_i$ is a circularly symmetric complex Gaussian random variable with a large average value and corresponds to a Rician channel with a large K, $h_s$, is a circularly symmetric complex Gaussian random variable whose average value is zero and corresponds to a Rayleigh channel, and n is also a circularly symmetric complex Gaussian random variable whose average value is zero.

The step of self-interference cancellation is as follows: a communications equipment evaluates self-interference channel response $\hat{h}_i$ and determines a signal x transmitted by itself. Therefore, a self-interference signal $\hat{h}_i x$ on an RX antenna is reconstructed, and then self-interference signals are eliminated from received signals. Suppose that $h_x$ is the equivalent self-interference channel response after self-interference is canceled, that is $h_x = h_i - \hat{h}_i$, so that the receive signal after the self-interference is canceled is:

$$y'_r = h_i x - \hat{h}_i x + h_s s + n$$
$$= h_x x + h_s s + n$$
$$= h_s s + n'$$

where, $n' = h_x x + n$ indicates remaining interference and noise after interferences are canceled.

Suppose $h_i \sim CN(\mu, \sigma_1^2)$ (that is, $h_i$ is subject to a circularly symmetric complex Gaussian random variable whose average value is $\mu$ and variance is $\sigma_1^2$, similarly hereinafter). Because the present channel estimation algorithm is deflection-free estimation, a channel response estimation value is $\hat{h}_i \sim CN(\mu, \sigma_2^2)$. The equivalent self-interference channel response after self-interference is canceled is $h_x \sim CN(0, \sigma_i^2)$. It should be noted that $h_i$ and $\hat{h}_i$ are not measured independently, therefore $\sigma_i^2$ is not equal to a $\sigma_1^2 + \sigma_2^2$. The specific value of $\sigma_i^2$ depends on the channel estimation algorithm in practical use. If a minimum mean square error (Minimum Mean Square Error, MMSE) algorithm is used, $$\sigma_i^2 = \frac{\sigma_1^2 \sigma_0^2}{\sigma_1^2 P_x + \sigma_0^2}$$

can be obtained through calculation, where, $P_x$ is the power of a transmit signal on the local end communications equipment.

In view of this, it may be known that the remaining self-interference power after self-interference is canceled is $\sigma_i^2 P_x$. When a system transmit power changes slowly, the remaining self-interference signal is a circularly symmetric complex Gaussian random variable whose average value is zero. The following conclusion is drawn: after self-interference is canceled, a channel between two full-duplex communications equipments is still an additive white Gaussian noise channel (Additive White Gaussian Noise channel, AWGN channel).

Therefore, an equivalent channel between two full-duplex communications equipments after self-interference is canceled may be expressed as follows:

$$y'_r = h_s s + n'$$

where, $n' = h_x x + n$ is remaining self-interference additive noise, $n' \sim CN(0, \sigma_i^2 P_x + \sigma_0^2)$, and $\sigma_0^2$ is the variance of the original noise.

Suppose that, for communications equipments, a channel matrix between two communications equipments is known. This is reasonable in practice. When the two communications equipments move slowly, a channel response changes slowly in time. In this case, channel response may be estimated through transmitting a reference signal from one communications equipment to the other communications equipment, and then the estimated channel response works as a channel response in a following period of time. Certainly, channel reciprocity may be used to simplify the channel estimation procedure.

Suppose $P_s$ is the power of a transmit signal s of a peer end communications equipment; $SNR = P_s / \sigma_0^2$ is the signal-to-noise ratio (Signal-to-Noise Ratio, SNR) without self-interference, and $IoT = (\sigma_i^2 P_x + \sigma_0^2) / \sigma_0^2$ is the ratio of the total power of remaining interference and noise after self-interference is canceled to the original noise, showing by how many times the remaining self-interference lifts an original noise threshold.

In this case, the total capacity of point-to-point full-duplex channels of two antennas is calculated as follows:

$$C_{FD} = \max_{i \in \{1,2\}} \left( \log\left(1 + \frac{|h_{1i}|^2 P_s}{\sigma_i^2 P_x + \sigma_0^2}\right) + \log\left(1 + \frac{|h_{2i}|^2 P_s}{\sigma_i^2 P_x + \sigma_0^2}\right) \right)$$

-continued $$= \max_{i \in \{1,2\}} \left( \log\left(1 + \frac{|h_{1i}|^2 SNR}{IoT}\right) + \log\left(1 + \frac{|h_{2i}|^2 SNR}{IoT}\right) \right)$$

where $\bar{i}=3-i$.

In the above capacity formula, i corresponds to two different antenna TX/RX combinations between two equipments.

Figure 5:
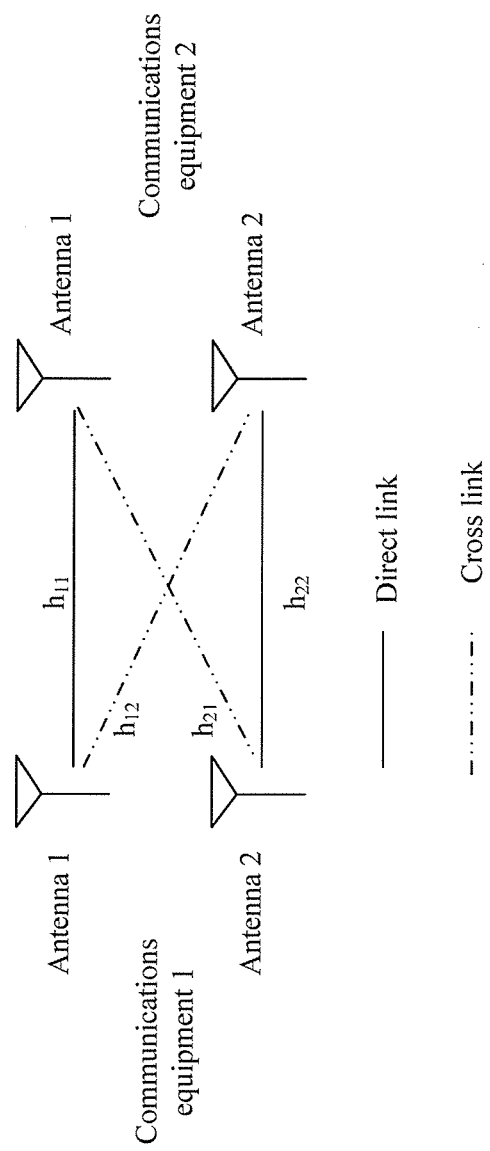
FIG. 5 is a schematic diagram of different antenna TX/RX combinations between a local end communications equipment provided with two antennas and a peer end communications equipment provided with two antennas.

FIG. 5 is a schematic diagram of different antenna TX/RX combinations between a local end communications equipment provided with two antennas and a peer end communications equipment provided with two antennas. As shown in FIG. 5, two different lines represent two different antenna TX/RX combinations respectively: an antenna 1 of a communications equipment 1 is used for transmitting signals, an antenna 2 of the communications equipment 1 is used for receiving signals, an antenna 1 of a communications equipment 2 is used for transmitting signals, and an antenna 2 of the communications equipment 2 is used for receiving signals; and the antenna 1 of the communications equipment 1 is used for transmitting signals, the antenna 2 of the communications equipment 1 is used for receiving signals, the antenna 1 of the communications equipment 2 is used for receiving signals, and the antenna 2 of the communications equipment 2 is used for transmitting signals.

In a half-duplex mode where the communications equipment knows the channel matrix, the capacity of an MIMO system refers to the capacity after power water-filling, and transmission is performed on corresponding characteristic channels. The channel capacity is expressed as follows:

$$C_{HD} = \log\left(1 + \frac{P^*(\lambda_1)\lambda_1^2}{\sigma_0^2}\right) + \log\left(1 + \frac{P^*(\lambda_2)\lambda_2^2}{\sigma_0^2}\right)$$

where $\pi_i$ (i=1, 2) is a singular value of the channel matrix; and $P^*(\lambda_i)$ corresponds to a system transmit power on the $i^{th}$ characteristic channel and meets the following equation set (where μ is determined according to the equation set and P is the total transmit power of a communications equipment):

$$P^*(\lambda_i) = \left(\mu - \frac{\sigma_0^2}{\lambda_i^2}\right)$$

$$\sum_{i=1}^{2}\left(\mu - \frac{\sigma_0^2}{\lambda_i^2}\right) = P$$

The $P^*(\lambda_i)$ expression obtained from the foregoing is substituted in the MIMO capacity formula to obtain the following formula:

$$C_{HD} = \log\left(\frac{\lambda_1^2}{\sigma_0^2}\mu\right) + \log\left(\frac{\lambda_1^2}{\sigma_0^2}\mu\right)$$

$$= \log\left(\frac{P\lambda_1^2}{2\sigma_0^2} + \frac{\lambda_1^2}{2}\left(-\frac{1}{\lambda_1^2} + \frac{1}{\lambda_2^2}\right)\right) +$$

$$\log\left(\frac{P\lambda_2^2}{2\sigma_0^2} + \frac{\lambda_2^2}{2}\left(\frac{1}{\lambda_1^2} - \frac{1}{\lambda_2^2}\right)\right)$$

For an impartial comparison, suppose that in a full-duplex transmission mode, the maximum system transmit power of each communications equipment is half the transmit power of a communications equipment in a half-duplex transmission mode, that is, $P_s=P/2$. In this case, in two transmission modes, the maximum system transmit power of the entire system is both P.

In a half-duplex capacity formula, suppose that $SNR=P/2\sigma_0^2=P_s/\sigma_0^2$, equivalent to averaging SNR of each data flow. In this case, the capacity formula may be expressed as follows:

$$C_{HD} = \log\left(\lambda_1^2 SNR + \frac{\lambda_1^2}{2}\left(-\frac{1}{\lambda_1^2} + \frac{1}{\lambda_2^2}\right)\right) + \log\left(\lambda_2^2 SNR + \frac{\lambda_2^2}{2}\left(-\frac{1}{\lambda_1^2} + \frac{1}{\lambda_2^2}\right)\right)$$

Because $\lim_{SNR\to\infty} C_{FD}/\log SNR = \lim_{SNR\to\infty} C_{HD}/\log SNR = 2$, the full-duplex transmission mode and the half-duplex transmission mode have the same degree of freedom, that is, at most two data streams can be transmitted in both modes.

Therefore, when the system channel matrix H is known, the transmission mode selecting method based on capacity is: if $C_{HD}(H) > C_{FD}(H)$, selecting the half-duplex transmission mode; if $C_{HD}(H) < C_{FD}(H)$, selecting the full-duplex transmission mode.

Under a high signal-to-noise ratio, if the power of remaining interference after full-duplex self-interference is canceled is very small compared with the power of receive signals, the principle for determining a transmission mode with an optimal capacity may be simplified. Supposing 1<IoT>>SNR, system capacity under two transmission modes may be expressed as follows:

$$C_{FD} = 2\log SNR + 2\max_{\{i=1,2\}} \log|h_{1i}||h_{2i}| - 2\log IoT$$

$$C_{HD} = 2\log SNR + 2\log|\lambda_1||\lambda_2| = 2\log SNR + 2\log|\det(H)|$$

When the remaining self-interference is very small, the full-duplex capacity of a system including the local end communications equipment provided with two antennas and the peer end communications equipment provided with two antennas depends on a larger value between the absolute value of a product of elements on a principal diagonal and the absolute value of a product of elements on a counter diagonal, and the half-duplex capacity depends on the absolute value of the determinant of the channel matrix.

The following further provides an intuitive explanation on the capacity-based transmission mode selecting method in a scenario where SNR is high and IoT (Interference over Thermal, interference over thermal) is low.

In this case, the channel matrix H is a 2×2 matrix including two point-to-point links, where link responses thereof correspond to elements on the principal diagonal and those on the counter diagonal respectively. The two links are termed a direct link and a cross link respectively, as shown in FIG. 5.

Full-duplex communications employ one between the direct link and the cross link for transmission, however, half-duplex communications employ the direct link and the cross link at the same time for transmission. In this situation, if the two links promote each other, the half-duplex transmission effect is better than the full-duplex transmission effect; and if the two links contradict each other, the full-duplex transmission effect is better than the half-duplex transmission effect.

In the embodiment of the present invention, the following describes promotion and contradiction of two links with a practical 2×2 H matrix. If the channel matrix is $$H = \begin{pmatrix} 3 & 1 \\ -1 & 2 \end{pmatrix},$$

channel gains of using the direct link to transmit two data streams are 6, and channel gains of using the cross link to transmit two data streams are 1. Therefore, the capacity index of full-duplex transmission is 6. In half-duplex transmission, Gaussian elimination may be used to eliminate interferences caused by one data flow on the other data flow, that is, $$H = \begin{pmatrix} 0 & 7 \\ -1 & 2 \end{pmatrix},$$

and the total gains of the two data streams are 7, that is the absolute value of the determinant. Under such channel matrix conditions, the two links promote each other.

If the channel matrix is $$H = \begin{pmatrix} 3 & 1 \\ 1 & 2 \end{pmatrix},$$

channel gains of using the direct link to transmit two data streams are 6, and channel gains of using the cross link to transmit two data streams are 1. Therefore, the capacity index of full-duplex transmission is 6. In half-duplex transmission, Gaussian elimination may be used to eliminate interferences caused by one data flow on the other data flow, that is, $$H = \begin{pmatrix} 0 & -5 \\ 1 & 2 \end{pmatrix},$$

and the total channel gains of the two data streams are 5, that is the absolute value of the determinant. Under such channel matrix conditions, the two links contradict each other.

It should be understood that in the embodiment of the present invention, a communications equipment provided with two antennas (also called 2-antenna communications equipment) may be extended to point-to-point communications between communications equipments provided with multiple antennas (also called multi-antenna communications equipments). When the channel matrix H is known, all possible candidate antenna TX/RX combinations of two communications equipments may be considered, this equals to dividing the channel matrix of the entire system or a channel matrix converted from the channel matrix of the entire system into four sub-matrices, and two sub-matrices on one diagonal is used for channel transmission. In this embodiment, a matrix conversion mode and a matrix partition mode bringing the maximum promotion among matrices on the same diagonals may be selected from channel matrices of the entire system. In this embodiment, the difference between the capacity index after matrix partition optimization and the capacity index of the entire system performing half-duplex communications may be used to show capacity gains of a full-duplex mode relative to a half-duplex transmission mode (relative capacity gains for short).

$$MPG = \max_{\substack{row/column\ transformation\ of\ H \\ c \in H_1\ and\ H_2\ are\ diagonal\ sub\text{-}matrices}} |\det(H_1 H_1^H)||\det(H_2 H_2^H)| - |\det(HH^H)|$$

where, $H_1$ and $H_2$ are sub-matrices on one diagonal after the partition of a channel matrix H or a matrix converted from the matrix H.

In the embodiment of the present invention, the relative capacity gain is termed matrix partitioning gain (Matrix Partitioning Gain, MPG).

In this case, in a scenario where SNR is high and IoT is low, the capacity-based transmission mode selecting principle is: if MPG−log IoT>0 selecting a full-duplex mode for communications; and if MPG−log IoT>0, selecting a half-duplex transmission mode for communications.

Supposing that two communications equipments are provided with M antennas and N antennas, respectively, to search for the greatest matrix partitioning gain, all candidate antenna TX/RX combinations need to be traversed, there are $$\frac{1}{2}\left(\sum_{i=1}^{N-1}\binom{N}{i}\right)\left(\sum_{j=1}^{M-1}\binom{M}{j}\right)$$

combinations. Certainly, an optimization algorithm may also be used to obtain a local optimum, to further obtain an effective compromise between performance and calculation complexity.

Figure 6A:
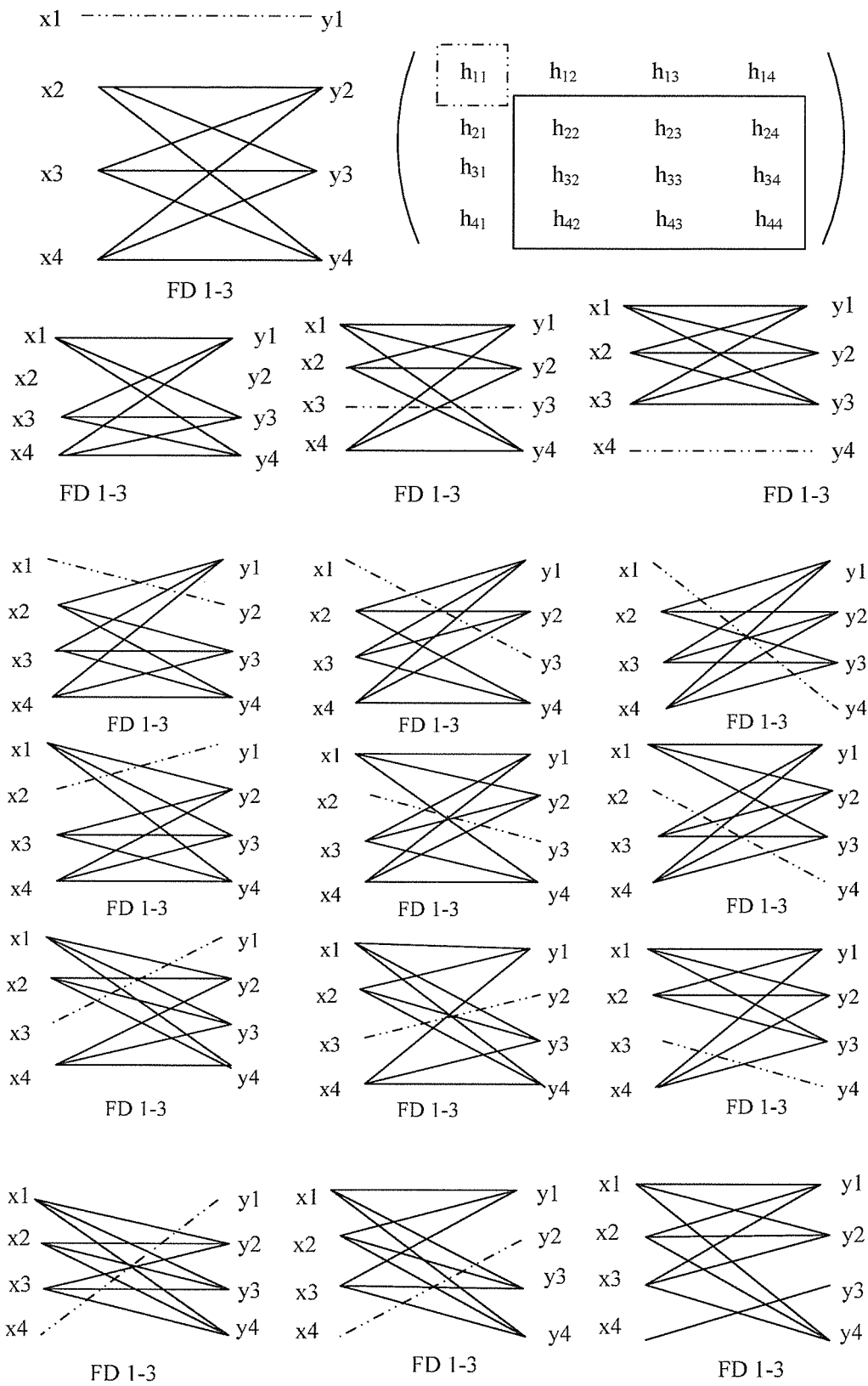
FIG. 6A and FIG. 6B are a schematic diagram of matrix partition of all candidate antenna TX/RX combinations in a full-duplex transmission mode by taking a local end communications equipment provided with four antennas and a peer end communications equipment provided with four antennas as an example according to an embodiment of the present invention.
Figure 6B:
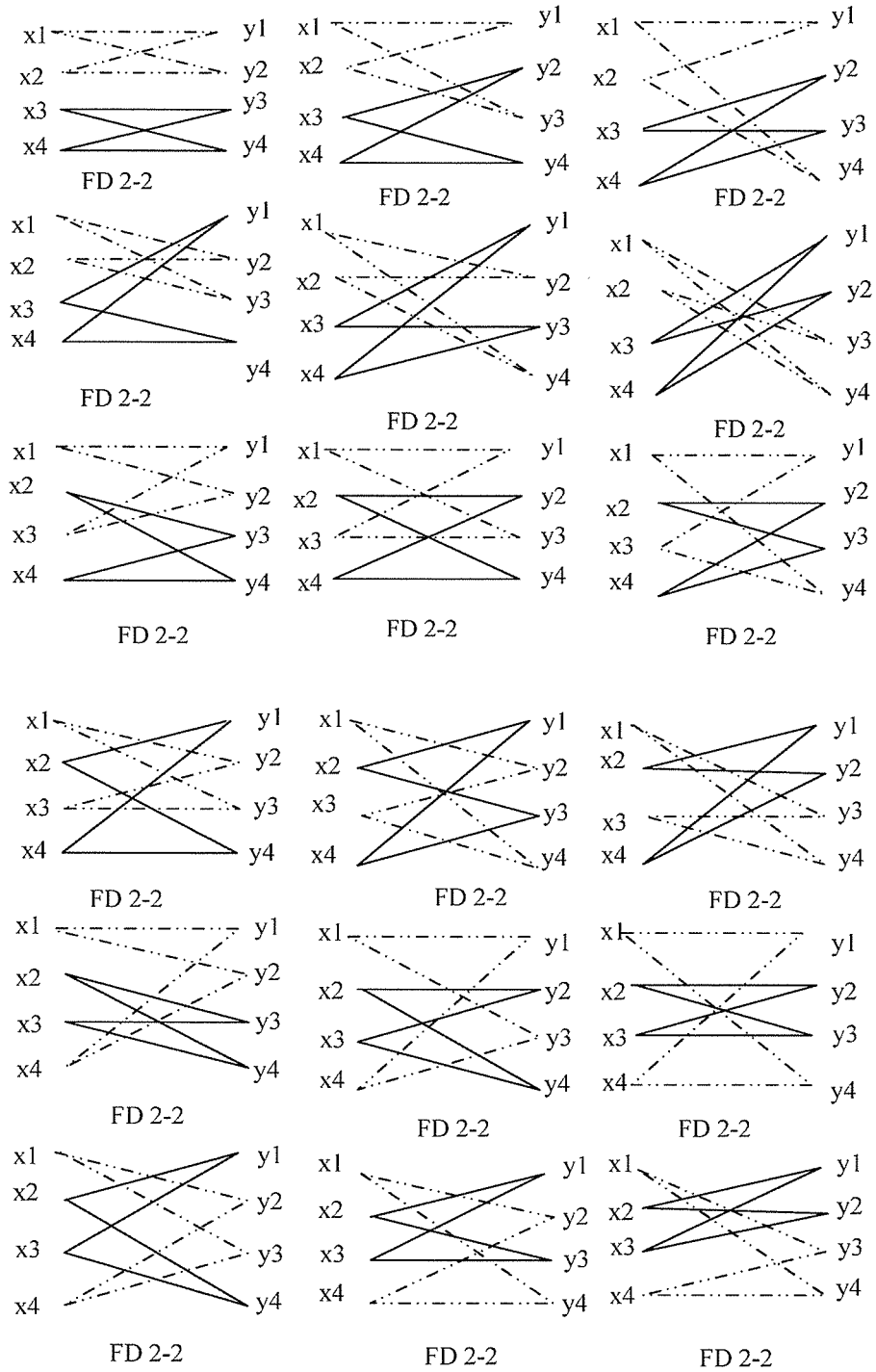

The following takes 4-antenna communications equipments as examples to illustrate the calculation of the matrix partitioning gain. In this case, H is a 4×4 matrix. If full-duplex communications is performed, for each communications equipment, one antenna may be used to serve as an RX antenna and the rest three antennas serve as TX antennas (when the matrix H has reciprocity between the two communications equipments, this scenario is equivalent to using one antenna as TX antenna and the rest three antennas as RX antennas), or, two antennas serve as RX antennas and the rest two antennas serve as TX antennas. As shown in FIG. 6A and FIG. 6B, the matrix partition of all candidate antenna TX/RX combinations in the full-duplex transmission mode is introduced by taking a local end communications equipment provided with four antennas and a peer end communications equipment provided with four antennas as examples.

Figure 7:
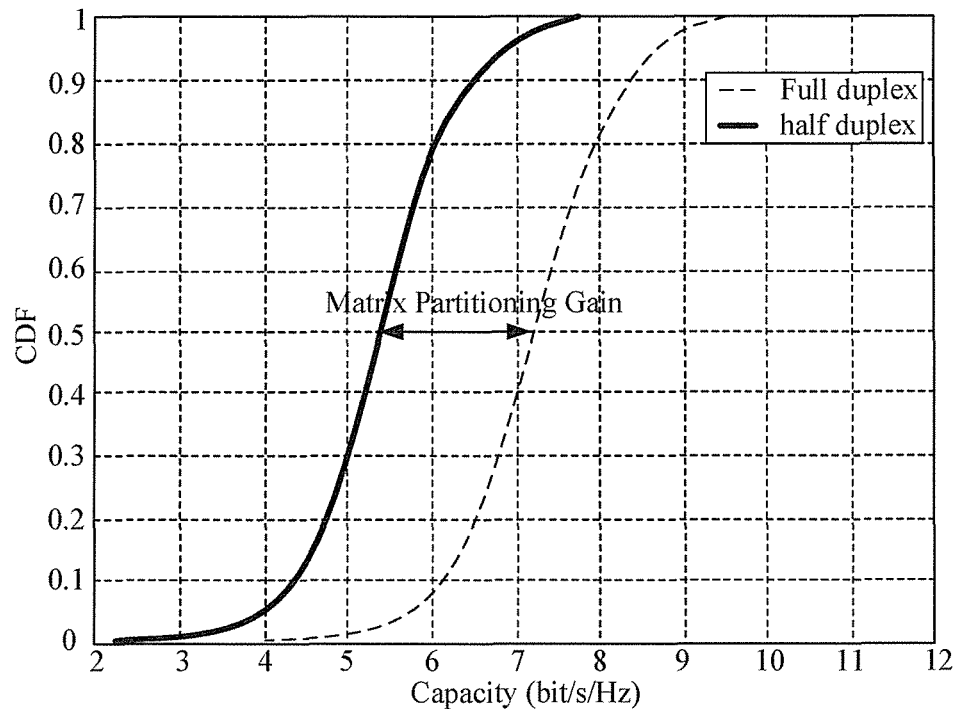
FIG. 7 is a schematic diagram of comparing the system capacity of a half-duplex MIMO and the system capacity of an optimal antenna TX/RX combination in a full-duplex transmission mode by taking a local end communications equipment provided with four antennas and a peer end communications equipment provided with four antennas as an example.

Elements in the matrix H are generated according to standard circularly symmetric complex Gaussian random variables; and then all possible matrix partitioning schemes thereof are substituted in the original capacity formulas for the full-duplex transmission mode and the half-duplex transmission mode. As shown in FIG. 7, the comparison between the half-duplex MIMO system capacity and the system capacity of the optimal antenna TX/RX combination in the full-duplex transmission mode is illustrated by taking the local end communications equipment provided with four antennas and the peer end communications equipment provided with four antennas as examples. In other words, FIG. 7 is a schematic diagram of the comparison between the cumulative distribution functions (Cumulative Distribution Function, CDF) of capacities of the two transmission modes, where the thin line indicates data in the full-duplex transmission mode and the thick line indicates data in the half-duplex transmission mode. It can be seen from FIG. 7 that after matrix partition optimization, the average capacity of the optimal antenna TX/RX combination in the full-duplex transmission mode increases by 40% compared with the capacity when an antenna TX/RX combination that all antennas are used for transmitting signals or all antennas are used for receiving signals is employed in the half-duplex transmission mode. It should be noted that in this embodiment, all antenna TX/RX combinations are traversed to obtain the average capacity of the optimal antenna TX/RX combination in the full-duplex transmission mode.

2. A Transmission Mode Selecting Method Based on System Transmit Power Optimization.

In this embodiment of the invention, a communications equipment in a cellular system is taken as an example for description. It should be understood that based on implementation manners described below, a person of ordinary skill in the art may derive knowledge about other communications equipments.

The prior art may be used to calculate the system transmit power in a half-duplex transmission mode.

For a full-duplex transmission mode, a channel matrix H between two communications equipments and a matrix channel converted from the channel matrix H are divided into four sub-matrices by using S different sub-matrix division modes. $H_1$ and $H_2$ are two sub-matrices on the principal diagonal or the counter diagonal. The system transmit power corresponding to two sub-matrices on the principal diagonal is calculated, and the system transmit power corresponding to two sub-matrices on the counter diagonal is calculated, to determine a smaller system transmit power as the system transmit power for the full-duplex mode under the matrix row and line change and matrix partition conditions.

Determine the number of matrices that are obtained through conversion for calculating the system transmit power and the number S of sub-matrices to be divided, where S is determined taking both system performance and technology complexity into consideration.

The minimum system transmit power among calculated transmit powers of all candidate full-duplex antenna TX/RX combinations is determined as a system transmit power of the full-duplex mode.

If the calculated minimum system transmit power of the full-duplex mode is smaller than a system transmit power of the half-duplex transmission mode, the antenna TX/RX combination corresponding to the calculated minimum system transmit power of the full-duplex transmission mode is used for transmission; and if the calculated system transmit power of the half-duplex transmission mode is smaller than the calculated minimum system transmit power of the full-duplex transmission mode, the half-duplex transmission mode is used for transmission. Reference may be made to the foregoing embodiments for specific details, and details are not provided herein again.

Based the above, transmission mode may be selected based on the following two optimization objects:

A. System capacity

Capacity calculation method:

1. When the SNR is low or the remaining self-interference after self-interference cancellation is greater than wanted signals, or when the self-interference and the desired signals are within the same order of magnitude, the conventional Shannon formula or MIMO capacity is used to calculate the system capacities of different antenna TX/RX combinations.

2. When the SINR is high and the remaining self-interference after self-interference cancellation is much smaller than wanted signals, matrix partition standards are used to simplify capacity evaluation.

B. System transmit power

System transmit power calculation method:

For an orthogonal frequency division multiplexing (Orthogonal Frequency Division Multiplexing, OFDM) system, the following manner may be used to calculate the minimum system transmit power in the half-duplex mode and the minimum system transmit power for different antenna TX/RX combinations in the full-duplex mode.

1. The existing resource scheduling algorithm (such as a proportional fair scheduling PFS, Proportional Fair Scheduling) is used for resource allocation according to volume of data a user needs to transmit and channel conditions on a resource block (Resource Block, RB, referring to a transmission resource formed by a plurality of OFDM symbols and sub-carriers).

2. The pre-coding matrix on transmission resources to be allocated is determined according to a channel matrix (the channel matrix H is used in a half-duplex mode; and sub-matrices $H_1$ and $H_2$ are used on a diagonal in a full-duplex mode), therefore channel gains on each data flow are calculated.

3. The modulation and coding scheme (Modulation and Coding Scheme, MCS) used in transmission is calculated according to the signal-to-interference-plus-noise ratio (Signal-to-Interference-plus-Noise Ratio, SINR) and QoS requirements for transmission (The QoS requirements may include time delay requirement and frame error rate requirement, for example, in a long term evolution (Long Term Evolution, LTE) system, the frame error rate of a physical downlink shared channel (Physical Downlink Shared Channel, PDSCH) is required to be smaller than 10%, and so on.).

4. Different systems have different SINR requirements corresponding to different MCSs. Then the minimum system transmit power of a communications equipment is determined according to the channel gains and noise threshold obtained from the steps 2 and 3, and the remaining self-interference power in the full-duplex mode.

In addition, the embodiments of the present invention further provide a related device and a system for implementing the foregoing methods.

Device Embodiment 1

Figure 12A:
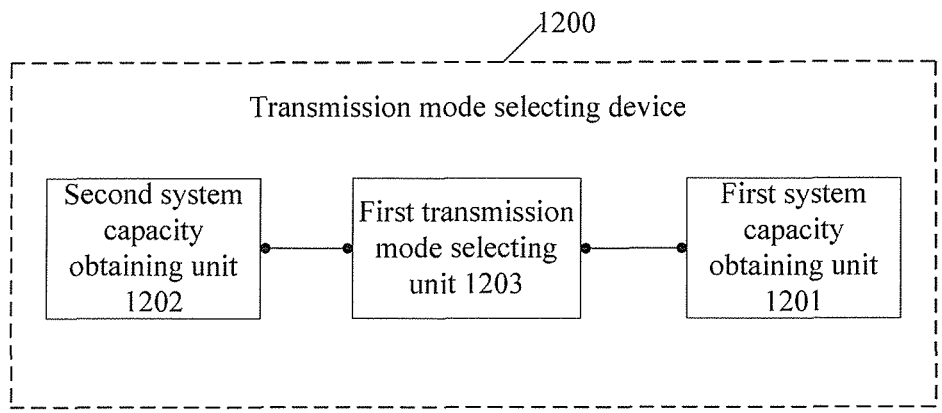
FIG. 12A is a schematic structural diagram of a transmission mode selecting device according to an embodiment of the present invention.

Referring to FIG. 12A, an embodiment of the present invention provides a transmission mode selecting device 1200, which may include: a first system capacity obtaining unit 1201, a second system capacity obtaining unit 1202, and a first transmission mode selecting unit 1203, where, the first system capacity obtaining unit 1201 is configured to obtain a first system capacity in a half-duplex transmission mode;

the second system capacity obtaining unit 1202 is configured to obtain a second system capacity in a full-duplex transmission mode. The second system capacity is the maximum value among system capacities of a universal set of candidate antenna TX/RX combinations in the full-duplex transmission mode, or the maximum value among system capacities of a first subset of the candidate antenna TX/RX combinations in the full-duplex transmission mode, or a system capacity exceeding a system capacity threshold; and the first transmission mode selecting unit 1203 is configured to select a target transmission mode according to a comparison result between the first system capacity output by the first system capacity obtaining unit and the second system capacity output by the second system capacity obtaining unit. The target transmission mode is a transmission mode corresponding to a larger value between the first system capacity and the second system capacity.

In one implementation manner, the first transmission mode selecting unit 1203 is specifically configured to: when the second system capacity output by the second system capacity obtaining unit is greater than the first system capacity output by the first system capacity obtaining unit, select the full-duplex transmission mode; and if the second system capacity output by the second system capacity obtaining unit is smaller than the first system capacity output by the first system capacity obtaining unit, select the half-duplex transmission mode.

It should be understood that if the second system capacity is equal to the first system capacity, either of the transmission modes can be selected randomly, or it is determined, by further considering other factors, which transmission mode is selected.

Figure 12B:
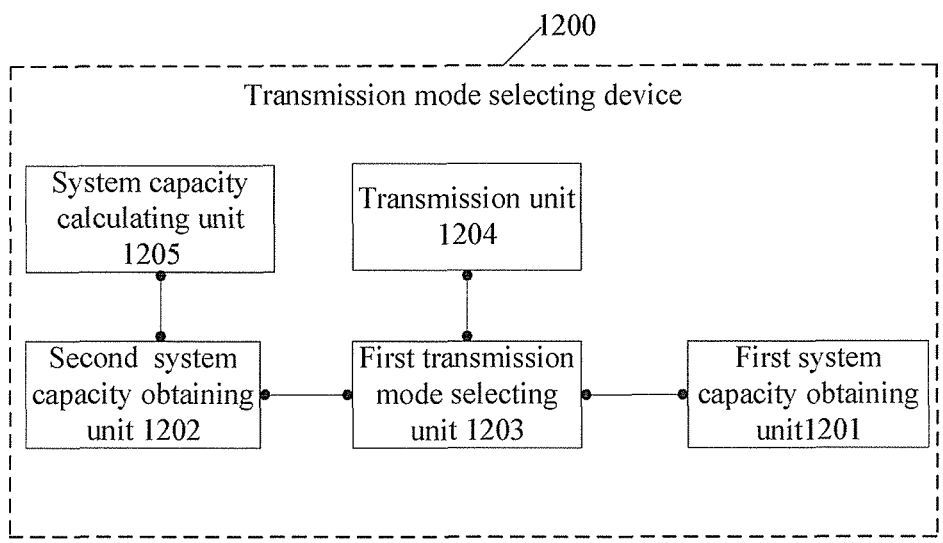
FIG. 12B is a schematic structural diagram of a transmission mode selecting device according to an embodiment of the present invention.

When this device is applied to a radio communications system including a first communications equipment provided with M antennas and a second communications equipment provided with N antennas, where M and N are integral numbers greater than 1, if the second system capacity is larger, the target transmission mode is the full-duplex transmission mode. As shown in FIG. 12B, the transmission mode selecting device 1200 according to the embodiment of the present invention further includes:

a transmission unit 1204, configured to perform full-duplex data transmission based on an antenna TX/RX combination corresponding to the second system capacity, where the antenna TX/RX combination corresponding to the second system capacity refers to a transmission mode of each antenna among M antennas on the first communications equipment, and a transmission mode of each antenna among N antennas on the second communications equipment when the full-duplex transmission mode is used for transmission. The transmission mode of the antennas is receiving signals or transmitting signals. In other words, which antennas among the M antennas on the first communications equipment employ the transmission mode of receiving signals and which antennas employ the transmission mode of transmitting signals. It should be understood that in the embodiment of the present invention, a candidate antenna TX/RX combination corresponding to the second system capacity indicates that one part of antennas among the M antennas on the first communications equipment employ the transmission mode of receiving signals and the other part of antennas employ the transmission mode of transmitting signals. However, it also should be understood that in extreme conditions, the candidate antenna TX/RX combination corresponding to the second system capacity may also indicate that all the M antennas on the first communications equipment employ the transmission mode of receiving signals, or may also indicate that all the M antennas on the first communications equipment employ the transmission mode of transmitting signals.

Further, the second communications equipment provided with N antennas is a single communications equipment, or a set of a plurality of communications equipments.

Or, if the first system capacity is larger, the target transmission mode is the half-duplex transmission mode. As shown in FIG. 12B, in the transmission mode selecting device 1200 provided by the embodiment of the present invention:

the transmission unit 1204 is further configured to perform half-duplex data transmission based on an antenna TX/RX combination corresponding to the first system capacity, where a candidate antenna TX/RX combination corresponding to the first system capacity indicates that the transmission mode of each antenna among M antennas on the first communications equipment is receiving signals, and the transmission mode of each antenna among N antennas on the second communications equipment is transmitting signals when the half-duplex transmission mode is used for transmission, or, the transmission mode of each antenna among M antennas on the first communications equipment is transmitting signals, and the transmission mode of each antenna among N antennas on the second communications equipment is receiving signals. It should be understood that in the half-duplex transmission mode, transmission and reception of the two communications equipments are switched according to channel reciprocity, and the channel capacity remains unchanged.

Also, in the embodiment of the present invention, the device further includes:

a system capacity calculating unit 1205, configured to calculate system capacities corresponding to all candidate antenna TX/RX combinations in the full-duplex transmission mode, where all the candidate antenna TX/RX combinations in the full-duplex transmission mode form the universal set; or, within a first calculation period threshold, calculate system capacities corresponding to a plurality of candidate antenna TX/RX combinations in the full-duplex transmission mode, where the plurality of candidate antenna TX/RX combinations corresponding to which the system capacities are calculated in the full-duplex transmission mode within a first calculation period threshold forms the first subset.

In one specific implementation manner, the system capacity calculating unit 1205 is specifically configured to:

divide a channel matrix of a system into 4 sub-matrices based on each matrix division mode among S matrix division modes for the channel matrix of the system, or divide a channel matrix converted from the channel matrix of the system into 4 sub-matrices based on each matrix division mode among S matrix division modes for the channel matrix converted from the channel matrix of the system;

select two sub-matrices on a principal diagonal and two sub-matrices on a counter diagonal, and calculate a first system capacity candidate value based on the two sub-matrices on the principal diagonal and a second system capacity candidate value based on the two sub-matrices on the counter diagonal; and determine a larger value between the first system capacity candidate value and the second system capacity candidate value as a system capacity corresponding to a current matrix division mode.

S is a universal set of all matrix division modes for the channel matrix of the system or the channel matrix converted from the channel matrix of the system, or a first subset of the universal set of all matrix division modes for the channel matrix of the system or the channel matrix converted from the channel matrix of the system.

Each matrix division mode among the S matrix division modes for the channel matrix of the system corresponds to a candidate antenna TX/RX combination, or each matrix division mode among the S matrix division modes for the channel matrix converted from the channel matrix of the system corresponds to a candidate antenna TX/RX combination, and S matrix division modes correspond to S different candidate antenna TX/RX combinations. It should be noted that the matrix mentioned here may be an original channel matrix, and also may be a converted channel matrix, where, S is an integral number greater than or equal to 1.

It can be seen from the above that, in the embodiment of the present invention, for a communications equipment in which TX/RX channels may be switched over flexibly on antennas, the following may be implemented: obtaining a first system capacity in a half-duplex transmission mode; obtaining a second system capacity in a full-duplex transmission mode, where the second system capacity is the maximum value among system capacities of a universal set of candidate antenna TX/RX combinations in the full-duplex transmission mode, or the maximum value among system capacities of a first subset of the candidate antenna TX/RX combinations in the full-duplex transmission mode, or a system capacity exceeding a system capacity threshold; and selecting a target transmission mode according to a comparison result between the first system capacity and the second system capacity, where the target transmission mode is a transmission mode corresponding to a larger value between the first system capacity and the second system capacity. That is, in the current channel condition where a multi-antenna system is running, a transmission mode enabling the system capacity to be increased or maximized is selected according to a system capacity increasing or maximizing rule, so as to achieve favorable or optimal system performance in current channel conditions of the system.

Device Embodiment 2

Figure 13A:
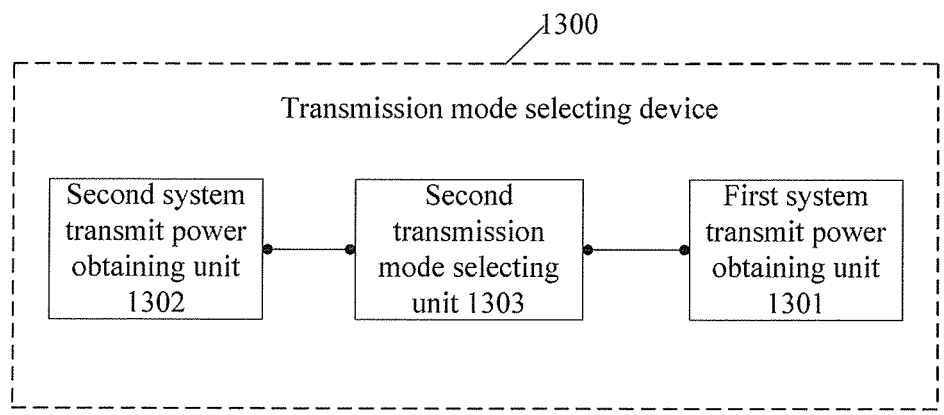
FIG. 13A is a schematic structural diagram of another transmission mode selecting device according to an embodiment of the present invention.

As shown in FIG. 13A, an embodiment of the present invention provides another transmission mode selecting device 1300, which may include: a first system transmit power obtaining unit 1301, a second system transmit power obtaining unit 1302, and a second transmission mode selecting unit 1303, where, the first system transmit power obtaining unit 1301 is configured to obtain a first system transmit power in a half-duplex transmission mode;

the second system transmit power obtaining unit 1302 is configured to obtain a second system transmit power in a full-duplex transmission mode, where the second system transmit power is the minimum value among system transmit powers of a universal set of candidate antenna TX/RX combinations in the full-duplex transmission mode, or the minimum value among system transmit powers of a second subset of the candidate antenna TX/RX combinations in the full-duplex transmission mode, or a system transmit power smaller than a system transmit power threshold; and the second transmission mode selecting unit 1303 is configured to select a target transmission mode according to a comparison result between the first system transmit power output by the first system transmit power obtaining unit and the second system transmit power output by the second system transmit power obtaining unit. The target transmission mode is a transmission mode corresponding to a smaller value between the first system transmit power and the second system transmit power.

In one implementation manner, the second transmission mode selecting unit 1303 is specifically configured to: if the second system transmit power output by the second system transmit power obtaining unit is smaller than the first system transmit power output by the first system transmit power obtaining unit, select the full-duplex transmission mode; and if the second system transmit power output by the second system transmit power obtaining unit is greater than the first system transmit power output by the first system transmit power obtaining unit, select the half-duplex transmission mode.

It should be understood that if the second system transmit power is equal to the first system transmit power, either of the transmission modes can be selected randomly, or, it is determined, by further considering other factors, which transmission mode is selected.

Figure 13B:
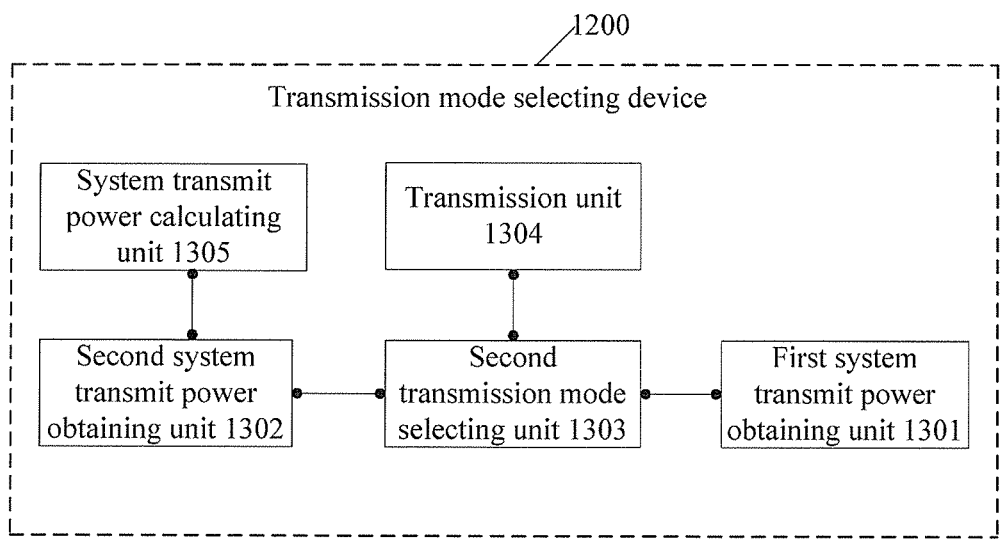
FIG. 13B is a structural schematic diagram of another transmission mode selecting device according to an embodiment of the present invention.

When this device is applied to a radio communications system including a first communications equipment provided with M antennas and a second communications equipment provided with N antennas, where M and N are integral numbers greater than 1, if the second system transmit power is smaller, the target transmission mode is the full-duplex transmission mode. As shown in FIG. 13B, the transmission mode selecting device 1300 according to the embodiment of the present invention further includes:

a transmission unit 1304, further configured to perform full-duplex data transmission based on an antenna TX/RX combination corresponding to the second system transmit power, where the antenna TX/RX combination corresponding to the second system transmit power refers to a transmission mode of each antenna among M antennas on the first communications equipment, and a transmission mode of each antenna among N antennas on the second communications equipment when the full-duplex transmission mode is used for transmission. The transmission mode of the antennas is receiving signals or transmitting signals.

Further, the second communications equipment provided with N antennas is a single communications equipment, or a set of a plurality of communications equipments.

Or, if the first system transmit power is smaller, the target transmission mode is the half-duplex transmission mode. As shown in FIG. 13B, in the transmission mode selecting device 1300 according to the embodiment of the present invention:

the transmission unit 1304 is further configured to perform half-duplex data transmission based on an antenna TX/RX combination corresponding to the first system transmit power, where the candidate antenna TX/RX combination corresponding to the first system transmit power indicates that the transmission mode of each antenna among M antennas on the first communications equipment is receiving signals, and the transmission mode of each antenna among N antennas on the second communications equipment is transmitting signals when the half-duplex transmission mode is used for transmission, or, the transmission mode of each antenna among M antennas on the first communications equipment is transmitting signals, and the transmission mode of each antenna among N antennas on the second communications equipment is receiving signals. It should be understood that, in the half-duplex data transmission mode, transmission and reception of the two communications equipments are switched according to channel reciprocity, and the calculated system capacity remains unchanged.

Also, the transmission mode selecting device 1300 according to the embodiment of the present invention further includes:

a system transmit power calculating unit 1305, configured to calculate system transmit powers corresponding to all candidate antenna TX/RX combinations in the full-duplex transmission mode, where all the candidate antenna TX/RX combinations in the full-duplex transmission mode form the universal set; or, within a second calculation period threshold, calculate system transmit powers corresponding to a plurality of candidate antenna TX/RX combinations in the full-duplex transmission mode, where the plurality of candidate antenna TX/RX combinations corresponding to which the system transmit powers are calculated in the full-duplex transmission mode within a second calculation period threshold forms the second subset.

In a specific implementation manner, the system transmit power calculating unit 1305 is specifically configured to:

divide a channel matrix of a system into 4 sub-matrices based on each matrix division mode among S matrix division modes for the channel matrix of the system, or divide a channel matrix converted from the channel matrix of the system into 4 sub-matrices based on each matrix division mode among S matrix division modes for the channel matrix converted from the channel matrix of the system;

select two sub-matrices on a principal diagonal and two sub-matrices on a counter diagonal, and calculate a first system transmit power candidate value based on the two sub-matrices on the principal diagonal and a second system transmit power candidate value based on the two sub-matrices on the counter diagonal; and determine a smaller value between the first system transmit power candidate value and the second system transmit power candidate value as a system transmit power corresponding to a current matrix division mode.

S is a universal set of all matrix division modes for the channel matrix of the system or the channel matrix converted from the channel matrix of the system, or a second subset of the universal set of all matrix division modes for the channel matrix of the system or the channel matrix converted from the channel matrix of the system.

Each matrix division mode among the S matrix division modes for the channel matrix of the system corresponds to a candidate antenna TX/RX combination, or each matrix division mode among the S matrix division modes for the channel matrix converted from the channel matrix of the system corresponds to a candidate antenna TX/RX combination, and S matrix division modes correspond to S different candidate antenna TX/RX combinations. It should be noted that the matrix mentioned here may be an original channel matrix, and also may be a converted channel matrix, where, S is an integral number greater than or equal to 1.

The conversion manner in which the channel matrix is converted from the channel matrix of the system in the embodiment of the present invention is that: in the channel matrix, changing the sequence of row vectors in the matrix and/or changing the sequence of column vectors in the matrix.

It can be seen from the above that, in the embodiment of the present invention, for a communications equipment in which TX/RX channels may be switched over flexibly on antennas, the following may be implemented: obtaining a first system transmit power in a half-duplex transmission mode; obtaining a second system transmit power in a full-duplex transmission mode, where the second system transmit power is the minimum value among system transmit powers of a universal set of candidate antenna TX/RX combinations in the full-duplex transmission mode, or the minimum value among system transmit powers of a second subset of the candidate antenna TX/RX combinations in the full-duplex transmission mode, or a system transmit power smaller than a system transmit power threshold; and selecting a target transmission mode based on a comparison result between the first system transmit power and the second system transmit power, where the target transmission mode is a transmission mode corresponding to a smaller value between the first system transmit power and the second system transmit power. That is, in the current channel condition where a multi-antenna system is running, a transmission mode enabling the system transmit power to be decreased or minimized is selected according to a system transmit power decreasing or minimizing rule, so as to achieve favorable or optimal system performance in current channel conditions of the system.

Device Embodiment 3

Figure 14:
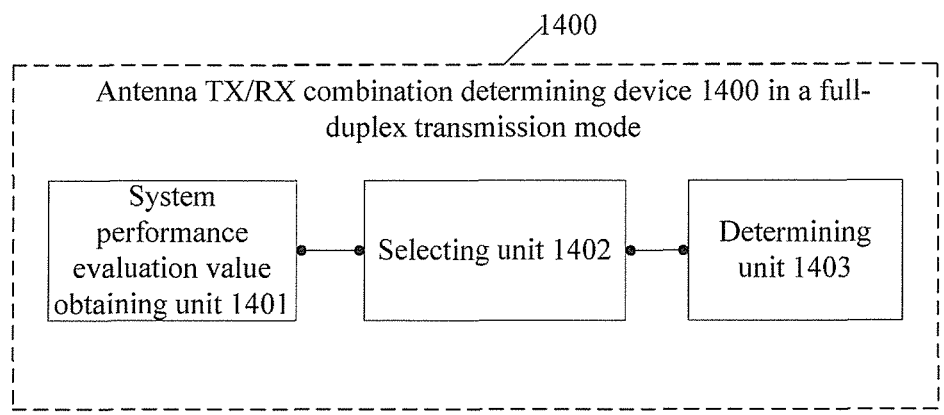
FIG. 14 is a schematic structural diagram of an antenna TX/RX combination determining device in a full-duplex transmission mode according to an embodiment of the present invention.

Referring to FIG. 14, an embodiment of the present invention provides an antenna TX/RX combination determining device 1400 in a full-duplex transmission mode, which may include: a system performance evaluation value obtaining unit 1401, a selecting unit 1402, and a determining unit 1403, where:

the system performance evaluation value obtaining unit 1401 is configured to obtain system performance evaluation values corresponding to a plurality of candidate antenna TX/RX combinations in the full-duplex transmission mode, where the plurality of candidate antenna TX/RX combinations is a universal set of candidate antenna TX/RX combinations in the full-duplex transmission mode, or a third subset of the universal set of candidate antenna TX/RX combinations in the full-duplex transmission mode;

the selecting unit 1402 is configured to select an optimal performance evaluation value among the system performance evaluation values corresponding to the plurality of candidate antenna TX/RX combinations and output by the system performance evaluation value obtaining unit, or a target performance evaluation value superior to a system performance threshold among the system performance evaluation values corresponding to the plurality of candidate antenna TX/RX combinations; and the determining unit 1403 is configured to determine a candidate antenna TX/RX combination corresponding to the optimal performance evaluation value or the target performance evaluation value as an adopted antenna TX/RX combination mode.

It should be understood that in different implementation manners, a system performance evaluation index may be a system capacity or a system transmit power or another index. Correspondingly, it should be understood that the system performance evaluation value may be a system capacity, a system transmit power, and various indexes capable of evaluating system performance.

Correspondingly, in the embodiment of the present invention, for different performance evaluation indexes, the "optimal" may be the largest value, a larger value, or a value greater than a target performance evaluation value (such as a system capacity), or the smallest value, a smaller value, or a value smaller than the target performance evaluation value (such as a system transmit power).

In one implementation manner, the system performance evaluation value obtaining unit 1401 is a system capacity calculating unit. The system capacity calculating unit is configured to calculate system capacities corresponding to all candidate antenna TX/RX combinations in the full-duplex transmission mode, where all the candidate antenna TX/RX combinations in the full-duplex transmission mode form the universal set; or, within a first calculation period threshold, calculate system capacities corresponding to a plurality of candidate antenna TX/RX combinations in the full-duplex transmission mode, where the plurality of candidate antenna TX/RX combinations corresponding to which the system capacities are calculated in the full-duplex transmission mode within the first calculation period threshold forms the third subset.

Correspondingly, the selecting unit 1402 is specifically configured to select the maximum system capacity among the system capacities corresponding to the plurality of candidate antenna TX/RX combinations, or, select a target system capacity greater than a system capacity threshold among the system capacities corresponding to the plurality of candidate antenna TX/RX combinations.

Correspondingly, the determining unit 1403 is specifically configured to determine a candidate antenna TX/RX combination corresponding to the maximum system capacity or the target system capacity as an adopted antenna TX/RX combination mode.

Further, in one implementation manner, the system capacity calculating unit is specifically configured to:
 divide a channel matrix of a system into 4 sub-matrices based on each matrix division mode among S matrix division modes for the channel matrix of the system, or divide a channel matrix converted from the channel matrix of the system into 4 sub-matrices based on each matrix division mode among S matrix division modes for the channel matrix converted from the channel matrix of the system;
 select two sub-matrices on a principal diagonal and two sub-matrices on a counter diagonal, and calculate a first system capacity candidate value based on the two sub-matrices on the principal diagonal and a second system capacity candidate value based on the two sub-matrices on the counter diagonal; and
 determine a larger value between the first system capacity candidate value and the second system capacity candidate value as a system capacity corresponding to a current matrix division mode.

S is a universal set of all matrix division modes for the channel matrix of the system or the channel matrix converted from the channel matrix of the system, or a third subset of the universal set of all matrix division modes for the channel matrix of the system or the channel matrix converted from the channel matrix of the system.

Each matrix division mode among the S matrix division modes for the channel matrix of the system corresponds to a candidate antenna TX/RX combination, or each matrix division mode among the S matrix division modes for the channel matrix converted from the channel matrix of the system corresponds to a candidate antenna TX/RX combination, and S matrix division modes correspond to S different candidate antenna TX/RX combinations. It should be noted that the matrix mentioned here may be an original channel matrix, and also may be a converted channel matrix, where, S is an integral number greater than or equal to 1.

In another implementation manner, the system performance evaluation value obtaining unit 1401 is a system transmit power calculating unit. The system transmit power calculating unit is configured to calculate system transmit powers corresponding to all candidate antenna TX/RX combinations in the full-duplex transmission mode, where all the candidate antenna TX/RX combinations in the full-duplex transmission mode form the universal set; or, within a second calculation period threshold, calculate system transmit powers corresponding to a plurality of candidate antenna TX/RX combinations in the full-duplex transmission mode, where the plurality of candidate antenna TX/RX combinations corresponding to which the system transmit powers are calculated in the full-duplex transmission mode within the second calculation period threshold forms the third subset.

Correspondingly, the selecting unit 1402 is specifically configured to select the minimum system transmit power among the system transmit powers corresponding to the plurality of candidate antenna TX/RX combinations, or, select a target system transmit power smaller than a system transmit power threshold among the system transmit powers corresponding to the plurality of candidate antenna TX/RX combinations.

Correspondingly, the determining unit 1403 is specifically configured to determine a candidate antenna TX/RX combination corresponding to the minimum system transmit power or the target system transmit power as an adopted antenna TX/RX combination mode.

Further, in a specific implementation manner, the system transmit power calculating unit is specifically configured to:
 divide a channel matrix of a system into 4 sub-matrices based on each matrix division mode among S matrix division modes for the channel matrix of the system, or divide a channel matrix converted from the channel matrix of the system into 4 sub-matrices based on each matrix division mode among S matrix division modes for the channel matrix converted from the channel matrix of the system;
 select two sub-matrices on a principal diagonal and two sub-matrices on a counter diagonal, and calculate a first system transmit power candidate value based on the two sub-matrices on the principal diagonal and a second system transmit power candidate value based on the two sub-matrices on the counter diagonal; and
 determine a smaller value between the first system transmit power candidate value and the second system transmit power candidate value as a system transmit power corresponding to a current matrix division mode.

S is a universal set of all matrix division modes for the channel matrix of the system or the channel matrix converted from the channel matrix of the system, or a third subset of the universal set of all matrix division modes for the channel matrix of the system or the channel matrix converted from the channel matrix of the system.

Each matrix division mode among the S matrix division modes for the channel matrix of the system corresponds to a candidate antenna TX/RX combination, or each matrix division mode among the S matrix division modes for the channel matrix converted from the channel matrix of the system corresponds to a candidate antenna TX/RX combination, and S matrix division modes correspond to S different candidate antenna TX/RX combinations. It should be noted that the matrix mentioned here may be an original channel matrix, and also may be a converted channel matrix, where, S is an integral number greater than or equal to 1.

It can be seen from the above that, in the embodiment of the present invention, for a communications equipment in which TX/RX channels may be switched over flexibly on antennas, if a full-duplex transmission mode is used, the following may be implemented: obtaining system performance evaluation values corresponding to a plurality of candidate antenna TX/RX combinations in the full-duplex transmission mode, where the plurality of candidate antenna TX/RX combinations is a universal set of candidate antenna TX/RX combinations in the full-duplex transmission mode, or a third subset of the universal set of candidate antenna TX/RX combinations in the full-duplex transmission mode; selecting an optimal performance evaluation value among the system performance evaluation values corresponding to the plurality of candidate antenna TX/RX combinations, or, selecting a target performance evaluation value superior to a system performance threshold among the system performance evaluation values corresponding to the plurality of candidate antenna TX/RX combinations; and determining a candidate antenna TX/RX combination corresponding to the optimal performance evaluation value or the target performance evaluation value as an adopted antenna TX/RX combination mode. That is, in the current channel condition where a multi-antenna system is running in the full-duplex transmission mode, an optimal or favorable antenna TX/RX combination in the full-duplex transmission mode is determined according to a system evaluation value improving or optimizing rule, so as to achieve favorable or optimal system performance in current channel conditions of the system.

Device Embodiment 4

Figure 15:
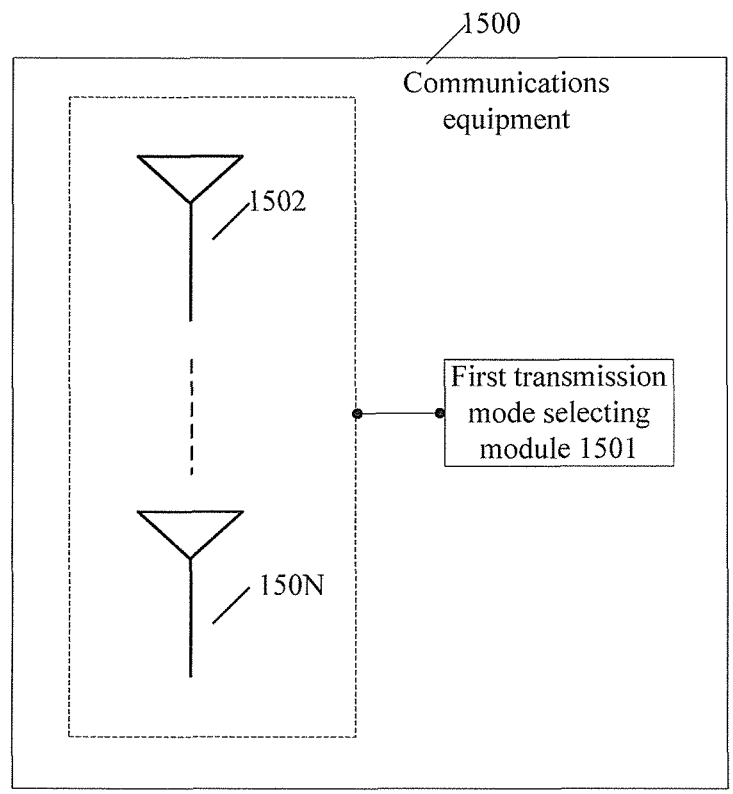
FIG. 15 is a schematic structural diagram of a communications equipment according to an embodiment of the present invention.

Referring to FIG. 15, an embodiment of the present invention provides a communications equipment 1500. The communications equipment 1500 includes: a plurality of antennas 1502 . . . 150N, and a first transmission mode selecting module 1501 coupled with the plurality of antennas 1502 . . . 150N, where the first transmission mode selecting module 1501 is the transmission mode selecting device described in Device Embodiment 1. Reference is made to foregoing method and device embodiments for further implementation details, and details are not provided herein again.

It can be seen from the above that, in the embodiment of the present invention, for a communications equipment in which TX/RX channels may be switched over flexibly on antennas, the following may be implemented: obtaining a first system capacity in a half-duplex transmission mode; obtaining a second system capacity in a full-duplex transmission mode, where the second system capacity is the maximum value among system capacities of a universal set of candidate antenna TX/RX combinations in the full-duplex transmission mode, or the maximum value among system capacities of a first subset of the candidate antenna TX/RX combinations in the full-duplex transmission mode, or a system capacity exceeding a system capacity threshold; and selecting a target transmission mode according to a comparison result between the first system capacity and the second system capacity, where the target transmission mode is a transmission mode corresponding to a larger value between the first system capacity and the second system capacity. That is, in the current channel condition where a multi-antenna system is running, a transmission mode enabling the system capacity to be increased or maximized is selected according to a system capacity increasing or maximizing rule, so as to achieve favorable or optimal system performance in current channel conditions of the system.

Device Embodiment 5

Figure 16:
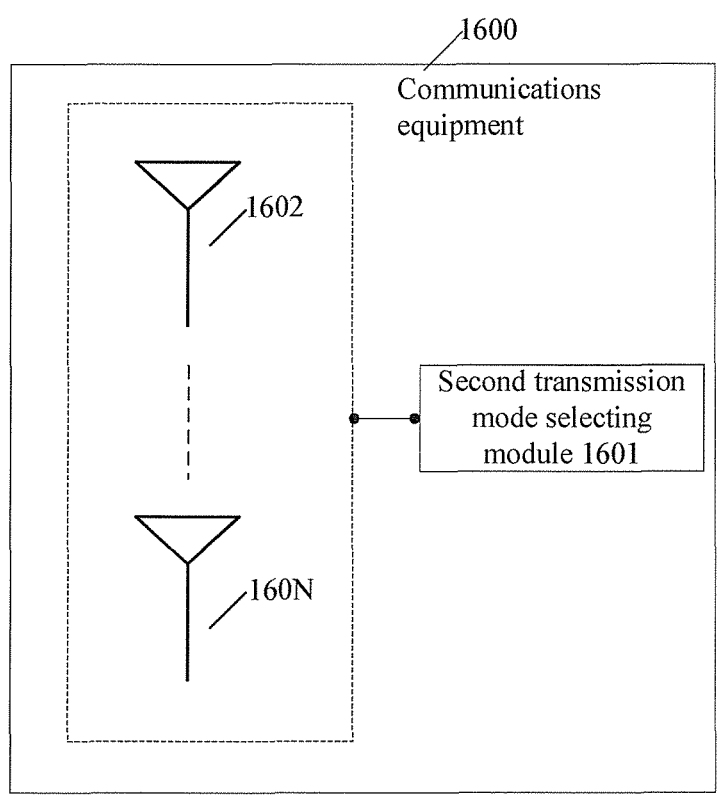
FIG. 16 is a schematic structural diagram of a communications equipment according to an embodiment of the present invention.

Referring to FIG. 16, an embodiment of the present invention provides a communications equipment 1600. The communications equipment 1600 includes: a plurality of antennas 1602 . . . 160N, and a second transmission mode selecting module 1601 coupled with the plurality of antennas 1602 . . . 160N, where the second transmission mode selecting module 1601 is the transmission mode selecting device described in Device Embodiment 2. Reference is made to foregoing method and device embodiments for further implementation details, and details are not provided herein again.

It can be seen from the above that, in the embodiment of the present invention, for a communications equipment in which TX/RX channels may be switched over flexibly on antennas, the following may be implemented: obtaining a first system transmit power in a half-duplex transmission mode; obtaining a second system transmit power in a full-duplex transmission mode, where the second system transmit power is the minimum value among system transmit powers of a universal set of candidate antenna TX/RX combinations in the full-duplex transmission mode, or the minimum value among system transmit powers of a second subset of the candidate antenna TX/RX combinations in the full-duplex transmission mode, or a system transmit power smaller than a system transmit power threshold; and selecting a target transmission mode according to a comparison result between the first system transmit power and the second system transmit power, where the target transmission mode is a transmission mode corresponding to a smaller value between the first system transmit power and the second system transmit power. That is, in the current channel condition where a multi-antenna system is running, a transmission mode enabling the system transmit power to be decreased or minimized is selected according to a system transmit power decreasing or minimizing rule, so as to achieve favorable or optimal system performance in current channel conditions of the system.

Device Embodiment 6

Figure 17:
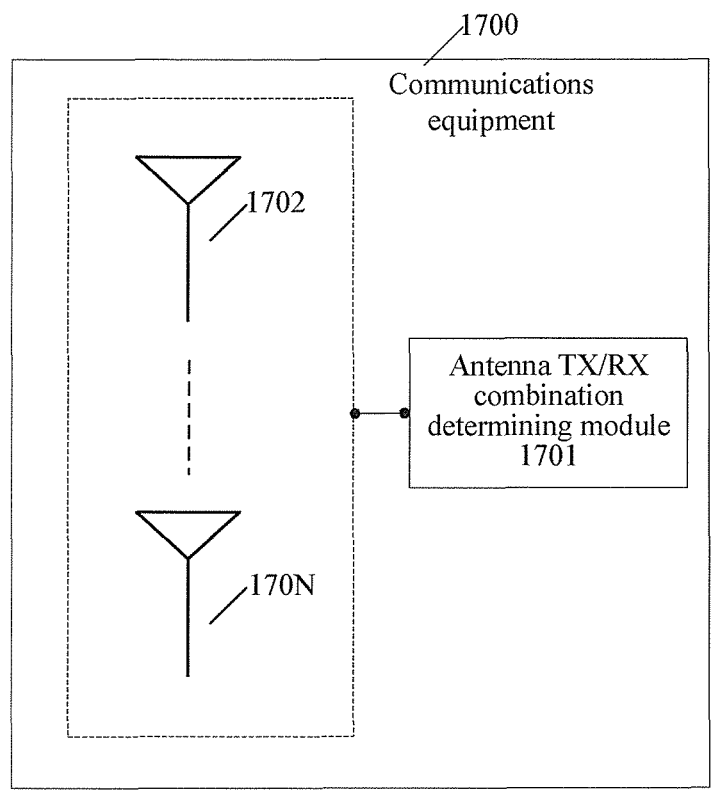
FIG. 17 is a schematic structural diagram of a communications equipment according to an embodiment of the present invention.

Referring to FIG. 17, an embodiment of the present invention provides a communications equipment 1700. The communications equipment 1700 includes: a plurality of antennas 1702 . . . 170N, and an antenna TX/RX combination determining module 1701 coupled with the plurality of antennas 1702 . . . 170N, where the antenna TX/RX combination determining module 1701 is the antenna TX/RX combination determining device in a full-duplex transmission mode described in Device Embodiment 3. Reference is made to foregoing method and device embodiments for further implementation details, and details are not provided herein again.

It can be seen from the above that, in the embodiment of the present invention, for a communications equipment in which TX/RX channels may be switched over flexibly on antennas, if a full-duplex transmission mode is used, the following may be implemented: obtaining system performance evaluation values corresponding to a plurality of candidate antenna TX/RX combinations in the full-duplex transmission mode, where the plurality of candidate antenna TX/RX combinations is a universal set of candidate antenna TX/RX combinations in the full-duplex transmission mode, or a third subset of the universal set of candidate antenna TX/RX combinations in the full-duplex transmission mode; selecting an optimal performance evaluation value among the system performance evaluation values corresponding to the plurality of candidate antenna TX/RX combinations, or, selecting a target performance evaluation value superior to a system performance threshold among the system performance evaluation values corresponding to the plurality of candidate antenna TX/RX combinations; and determining a candidate antenna TX/RX combination corresponding to the optimal performance evaluation value or the target performance evaluation value as an adopted antenna TX/RX combination mode. That is, in the current channel condition where a multi-antenna system is running in the full-duplex transmission mode, an optimal or favorable antenna TX/RX combination in the full-duplex transmission mode is determined according to a system evaluation value improving or optimizing rule, so as to achieve favorable or optimal system performance in current channel conditions of the system.

Figure 18:
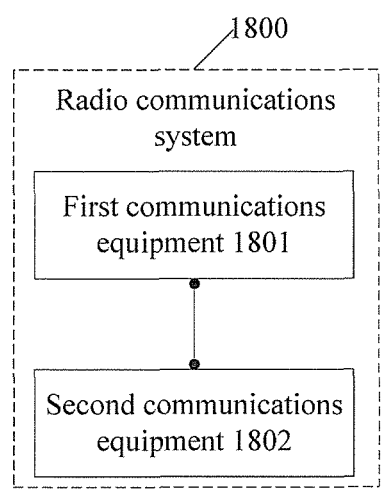
FIG. 18 is a schematic structural diagram of a radio communications system according to an embodiment of the present invention.

Referring to FIG. 18, an embodiment of the present invention further provides a radio communications system 1800, which may include: a first communications equipment 1801 and a second communications equipment 1802, where:

the first communications equipment 1801 is configured to: when needing to transmit data to the second communications equipment, obtain a first system capacity in a half-duplex transmission mode; obtain a second system capacity in a full-duplex transmission mode, where the second system capacity is the maximum value among system capacities of a universal set of candidate antenna TX/RX combinations in the full-duplex transmission mode, or the maximum value among system capacities of a first subset of the candidate antenna TX/RX combinations in the full-duplex transmission mode, or a system capacity exceeding a system capacity threshold; select a target transmission mode according to a comparison result between the first system capacity and the second system capacity, where the target transmission mode is a transmission mode corresponding to a larger value between the first system capacity and the second system capacity; and performs data transmission with the second communications equipment based on the target transmission mode.

It should be noted that the first communications equipment 1801 is provided with a plurality of antennas.

The second communications equipment 1802 is configured to receive data which is sent from the first communications equipment based on the target transmission mode, and/or, send data to the first communications equipment.

It should be noted that the second communications equipment 1802 may be a communications equipment provided with a plurality of antennas, or a set of a plurality of communications equipments, where if the second communications equipment 1802 is the set of a plurality of communications equipments, each communications equipment in the set of communications equipments may be provided with a plurality of antennas or provided with a single antenna.

Further, if the target transmission mode is a full-duplex transmission mode, the first communications equipment 1801 is specifically configured to perform full-duplex data transmission with the second communications equipment based on an antenna TX/RX combination corresponding to the second system capacity, where the antenna TX/RX combination corresponding to the second system capacity indicates a transmission mode of each antenna among M antennas on the first communications equipment, and a transmission mode of each antenna among N antennas on the second communications equipment when the full-duplex transmission mode is used for transmission. The transmission mode of the antenna is receiving signals or transmitting signals.

It should be understood that the adopted candidate antenna TX/RX combination is determined from a plurality of candidate antenna TX/RX combinations, and may be directly described as an antenna TX/RX combination.

Reference is made to foregoing method and device embodiments for further implementation details, and details are not provided herein again.

It can be seen from the above that, in the embodiment of the present invention, for a communications equipment in which TX/RX channels may be switched over flexibly on antennas, the following may be implemented: obtaining a first system capacity in a half-duplex transmission mode; obtaining a second system capacity in a full-duplex transmission mode, where the second system capacity is the maximum value among system capacities of a universal set of candidate antenna TX/RX combinations in the full-duplex transmission mode, or the maximum value among system capacities of a first subset of the candidate antenna TX/RX combinations in the full-duplex transmission mode, or a system capacity exceeding a system capacity threshold; and selecting a target transmission mode according to a comparison between the first system capacity and the second system capacity, where the target transmission mode is a transmission mode corresponding to a larger value between the first system capacity and the second system capacity. That is, in the current channel condition where a multi-antenna system is running, a transmission mode enabling the system capacity to be increased or maximized is selected according to a system capacity increasing or maximizing rule, so as to achieve favorable or optimal system performance in current channel conditions of the system.

Further, in the embodiment of the present invention, for a communications equipment in which TX/RX channels may be switched over flexibly on antennas, if a full-duplex transmission mode is used, the following may be implemented: obtaining system performance evaluation values corresponding to a plurality of candidate antenna TX/RX combinations in the full-duplex transmission mode, where the plurality of candidate antenna TX/RX combinations is a universal set of candidate antenna TX/RX combinations in the full-duplex transmission mode, or a third subset of the universal set of candidate antenna TX/RX combinations in the full-duplex transmission mode; selecting an optimal performance evaluation value among the system performance evaluation values corresponding to the plurality of candidate antenna TX/RX combinations, or, selecting a target performance evaluation value superior to a system performance threshold among the system performance evaluation values corresponding to the plurality of candidate antenna TX/RX combinations; and determining a candidate antenna TX/RX combination corresponding to the optimal performance evaluation value or the target performance evaluation value as an adopted antenna TX/RX combination mode. That is, in the current channel condition where a multi-antenna system is running in the full-duplex transmission mode, an optimal or favorable antenna TX/RX combination in the full-duplex transmission mode is determined according to a system evaluation value improving or optimizing rule, so as to achieve favorable or optimal system performance in current channel conditions of the system.

Figure 19:
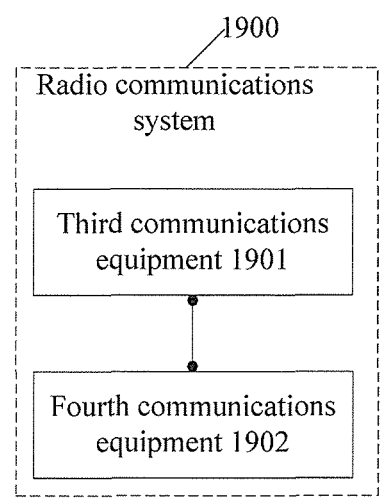
FIG. 19 is a schematic structural diagram of a radio communications system according to an embodiment of the present invention.

Referring to FIG. 19, an embodiment of the present invention further provides a radio communications system, which may include: a third communications equipment 1901 and a fourth communications equipment 1902, where The third communications equipment 1901 is configured to; when needing to perform data transmission with the second communications equipment, obtain a first system transmit power in a half-duplex transmission mode; obtain a second system transmit power in a full-duplex transmission mode. The second system transmit power is the minimum value among system transmit powers of a universal set of candidate antenna TX/RX combinations in the full-duplex transmission mode, or the minimum value among system transmit powers of a second subset of the candidate antenna TX/RX combinations in the full-duplex transmission mode, or a system transmit power smaller than a system transmit power threshold; select a target transmission mode according to a comparison result between the first system transmit power and the second system transmit power, where the target transmission mode is a transmission mode corresponding to a smaller value between the first system transmit power and the second system transmit power; and performs data transmission with the fourth communications equipment based on the target transmission mode.

It should be noted that the third communications equipment 1901 is provided with a plurality of antennas.

The fourth communications equipment 1902 is configured to receive data which is transmitted from the first communications equipment based on the target transmission mode, and/or, transmit data to the first communications equipment.

It should be noted that the fourth communications equipment 1902 may be a communications equipment provided with a plurality of antennas, or a set of a plurality of communications equipments, where, in the set of a plurality of communications equipments, each communications equipment may be provided with a plurality of antennas or provided with a single antenna.

Further, if the target transmission mode is the full-duplex transmission mode, the third communications equipment 1901 is specifically configured to perform full-duplex data transmission with the fourth communications equipment based on an antenna TX/RX combination corresponding to the second system transmit power, where the antenna TX/RX combination corresponding to the second system transmit power indicates a transmission mode of each antenna among M antennas on the third communications equipment, and a transmission mode of each antenna among N antennas on the fourth communications equipment when the full-duplex transmission mode is used for transmission. The transmission mode of the antenna is receiving signals or transmitting signals.

Reference is made to foregoing method and device embodiments for further implementation details, and details are not provided herein again.

It can be seen from the above that, in the embodiment of the present invention, for a communications equipment in which TX/RX channels may be switched over flexibly on antennas, the following may be implemented: obtaining a first system transmit power in a half-duplex transmission mode; obtaining a second system transmit power in a full-duplex transmission mode, where the second system transmit power is the minimum value among system transmit powers of a universal set of candidate antenna TX/RX combinations in the full-duplex transmission mode, or the minimum value among system transmit powers of a second subset of the candidate antenna TX/RX combinations in the full-duplex transmission mode, or a system transmit power smaller than a system transmit power threshold; and selecting a target transmission mode according to a comparison result between the first system transmit power and the second system transmit power, where the target transmission mode is a transmission mode corresponding to a smaller value between the first system transmit power and the second system transmit power. That is, in the current channel condition that a multi-antenna system is running, a transmission mode enabling the system transmit power to be decreased or minimized is selected according to a system transmit power decreasing or minimizing rule, so as to achieve favorable or optimal system performance in current channel conditions of the system.

Further, in the embodiment of the present invention, for a communications equipment in which TX/RX channels may be switched over flexibly on antennas, if a full-duplex transmission mode is used, the following may be implemented: obtaining system performance evaluation values corresponding to a plurality of candidate antenna TX/RX combinations in the full-duplex transmission mode, where the plurality of candidate antenna TX/RX combinations is a universal set of candidate antenna TX/RX combinations in the full-duplex transmission mode, or a third subset of the universal set of candidate antenna TX/RX combinations in the full-duplex transmission mode; selecting an optimal performance evaluation value among the system performance evaluation values corresponding to the plurality of candidate antenna TX/RX combinations, or, selecting a target performance evaluation value superior to a system performance threshold among the system performance evaluation values corresponding to the plurality of candidate antenna TX/RX combinations; and determining a candidate antenna TX/RX combination corresponding to the optimal performance evaluation value or the target performance evaluation value as an adopted antenna TX/RX combination mode. That is, in the current channel condition where a multi-antenna system is running in the full-duplex transmission mode, an optimal or favorable antenna TX/RX combination in the full-duplex transmission mode is determined according to a system evaluation value improving or optimizing rule, so as to achieve favorable or optimal system performance in current channel conditions of the system.

For a further understanding of the embodiment of the present invention, a communications equipment A is used to represent the first communications equipment or the third communications equipment in the system embodiment, and, a communications equipment B is used to represent the second communications equipment or the fourth communications equipment in the system embodiment to introduce the structure of the system according to the embodiment of the present invention.

Figure 8:
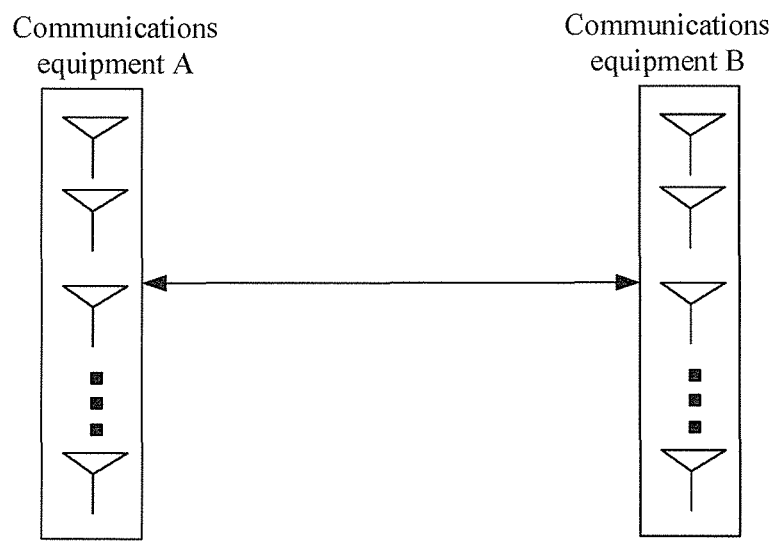
FIG. 8 is a schematic diagram of a system architecture for selecting a transmission mode between a local end communications equipment A and a peer end communications equipment B according to an embodiment of the present invention.

As shown in FIG. 8, FIG. 8 is a schematic diagram of a system architecture of for selecting a transmission mode between a local end communications equipment A and a peer end communications equipment B. It should be understood that through adopting the solution introduced by the foregoing embodiments of the present invention, whether the transmission mode between the communications equipment A and the communications equipment B is a full-duplex transmission mode or a half-duplex transmission mode may be determined; and, through adopting the solution introduced by the foregoing embodiments of the present invention, when the full-duplex mode is employed for transmission, whether the transmission mode of each antenna on the communications equipment A and the communications equipment B is receiving signals or transmitting signals may be determined.

Figure 9:
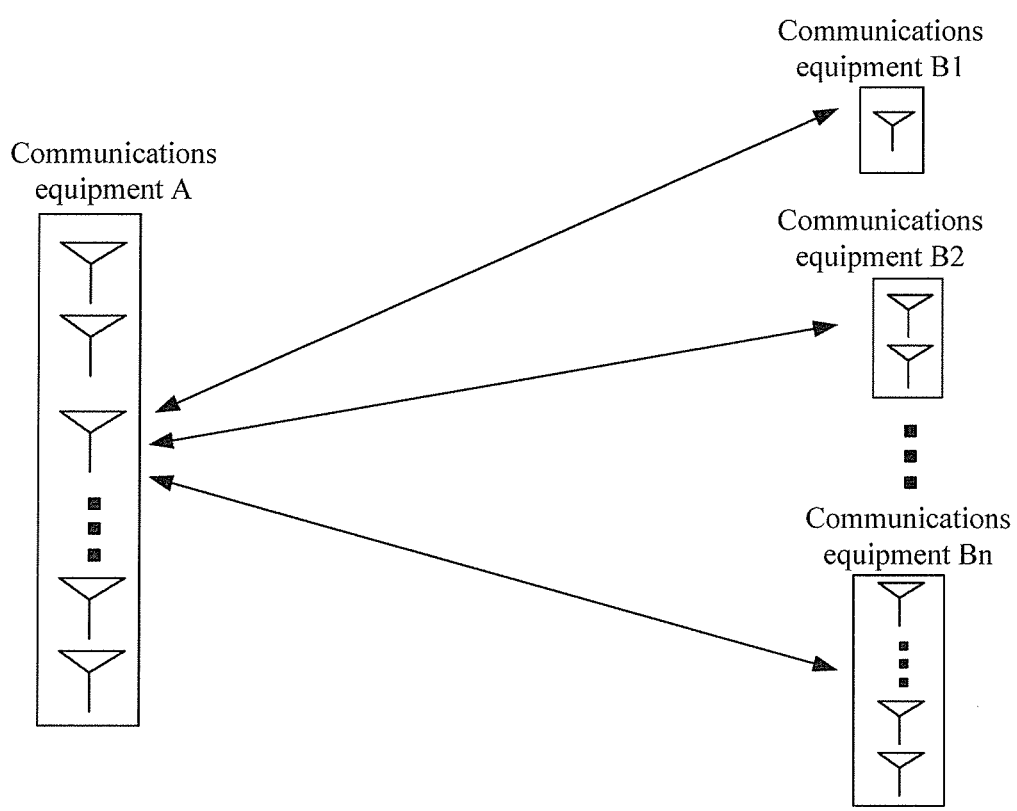
FIG. 9 is another schematic diagram of a system architecture in which a local end communications equipment A performs bidirectional transmission with a plurality of communications equipments B1, B2 . . . Bn on an overlapped time-frequency resource according to an embodiment of the present invention.

As shown in FIG. 9, FIG. 9 is a schematic diagram of another system architecture in which a local end communications equipment A and a plurality of communications equipments B1, B2 . . . Bn perform bidirectional transmission on an overlapped time-frequency resource according to an embodiment of the present invention. The communications equipment A has full-duplex transmission capability, and the communications equipments B1, B2 . . . Bn may be full-duplex equipments and also may be half-duplex equipments. It should be noted that the full-duplex transmission capability means that a communications equipment can perform self-interference cancellation, and antennas on one equipment can perform transmission and reception on the same time-frequency resource; and half-duplex transmission capability means that a communications equipment cannot perform self-interference cancellation, and antennas on one equipment cannot perform transmission and reception on the same time-frequency resource. Also, it should be understood that, in this embodiment, the set of the communications equipments B1 . . . Bn corresponds to the second communications equipment or the fourth communications equipment in the foregoing embodiments.

It should be noted that full-duplex transmission capability means that a communications equipment can perform self-interference cancellation, and antennas on one equipment can perform transmission and reception on the same time-frequency resource; and half-duplex transmission capability means that a communications equipment cannot perform self-interference cancellation, and antennas on one equipment cannot perform transmission and reception on the same time-frequency resource.

It should be understood that through adopting the solution introduced by the foregoing embodiments of the invention, whether the transmission mode between the communications equipment A and a communications equipment B formed by the set of communications equipments B1 . . . Bn is a full-duplex transmission mode or a half-duplex transmission mode can be determined; and, through adopting the solution introduced by the foregoing embodiments of the invention, when the full-duplex mode is employed for transmission, whether the transmission mode of each antenna on the communications equipment A and the communications equipment B formed by the communications equipments B1 . . . Bn is receiving signals or transmitting signals can be determined. Specifically:

1. A subset or a universal set is selected from the optional set of communications equipments B1 . . . Bn to form a communications equipment B, where the communications equipment B communicates with the communications equipment A.
2. For a communications equipment which has full-duplex transmission capability between the communications equipment A and the communications equipment B, whether each antenna on the communications equipment is used for transmitting signals or receiving signals is determined; or for a subset of communications equipments which are selected from the communications equipment A and the communications equipment B and have full-duplex transmission capability, whether each antenna in the communications equipment subset is used for transmitting signals or receiving signals is determined. Reference is made to other embodiments for other technical details, and details are not provided herein again.

The following further introduces two application scenarios of the embodiments of the present invention.

Application Scenario 1: Cellular Network

Figure 10:
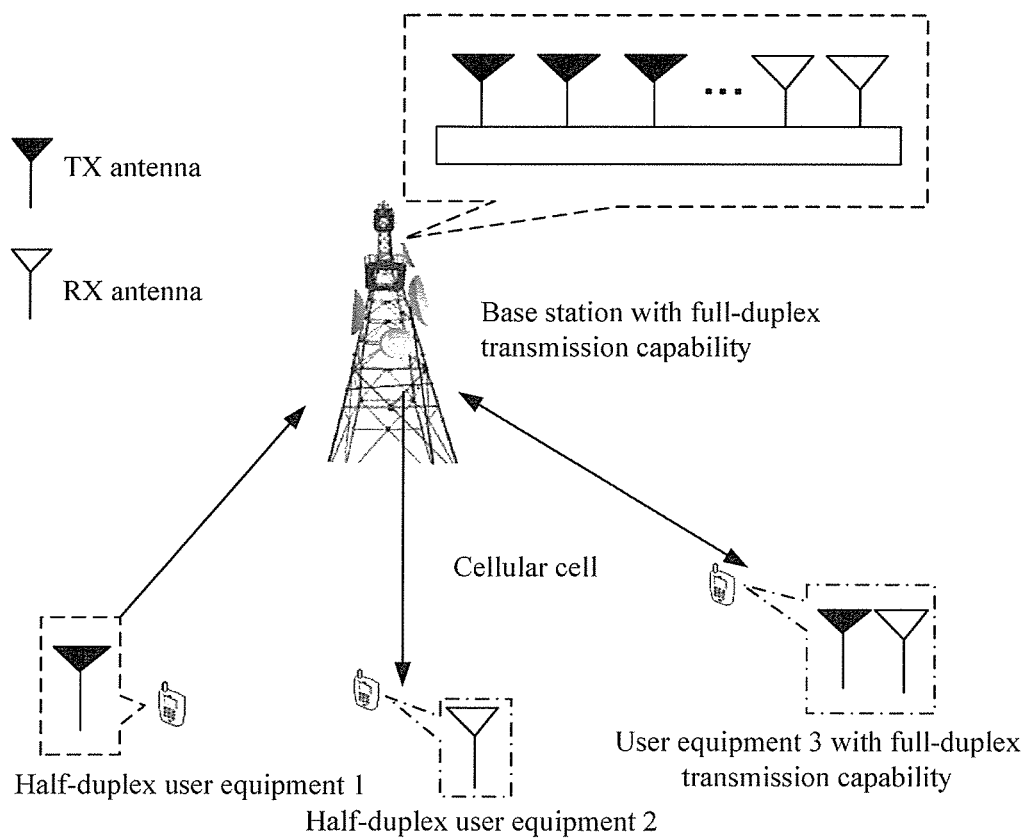
FIG. 10 is a schematic diagram of a scenario applied in a cellular network according to an embodiment of the present invention.

As shown in FIG. 10, if the embodiments of the present invention are applied to a cellular network, the first communications equipment or the third communications equipment or the communications equipment A according to the embodiments of the present invention may be a multi-antenna base station with the full-duplex transmission capacity in FIG. 10, such as a macro base station, a micro base station, a home base station, and so on. The second communications equipment or the fourth communications equipment or the communications equipment B according to the embodiments of the present invention may be a user equipment 3 in FIG. 10, or the equipment set forming the communications equipment B may include a user equipment 1, a user equipment 2, and the user equipment 3 in FIG. 10.

When the multi-antenna base station with the full-duplex transmission capacity communicates with the multi-antenna user equipment 3 with the full-duplex transmission capacity, system performance evaluation values in the half-duplex transmission mode and the full-duplex transmission mode can be compared according to system performance optimization indexes such as a system capacity and a system transmit power; a transmission mode corresponding to the optimal or favorable system performance evaluation value is selected as a target transmission mode based on a comparison result; and data transmission between the multi-antenna base station and the multi-antenna terminal 3 is performed based on the target transmission mode. For the full-duplex transmission mode, system performance evaluation values corresponding to all or part of antenna TX/RX combinations are calculated, and a transmission mode corresponding to the optimal or favorable system performance evaluation value is selected to perform transmission. Specifically, when the system performance evaluation values are calculated, a channel matrix or a converted channel matrix is divided, and two sub-matrices on a principal diagonal/counter diagonal are taken as two channel matrices in opposite transmission directions to calculate the system performance evaluation values corresponding to the antenna TX/RX combinations.

The multi-antenna base station with the full-duplex transmission capacity can also perform uplink and downlink transmission on the same time-frequency resource with a plurality of user equipments 1, 2, and 3. In this application scenario, not all the user equipments are required to have the full-duplex transmission capacity. As shown in FIG. 10, on the same time-frequency resource, the multi-antenna base station with the full-duplex transmission capacity performs uplink transmission with the user equipment 1, the multi-antenna base station with the full-duplex transmission capacity performs downlink transmission with the user equipment 2, and the multi-antenna base station performs uplink and downlink transmission at the same time with the user equipment 3. When selecting an uplink or downlink user equipment and/or selecting an antenna TX/RX combination of a full-duplex access user equipment, considering that different user equipments form a combination, antennas of the terminals are regarded to be on the same virtual equipment. Then according to a combined channel matrix formed by antennas of the base station and antennas of the user equipments 1, 2, and 3, system performance evaluation values corresponding to uplink or downlink user equipment selecting modes and/or antenna TX/RX combinations of a full-duplex user equipment are calculated according to different matrix conversion and sub-matrix division. Data transmission is performed according to the uplink or downlink user equipment selecting mode and/or the antenna TX/RX combinations of a full-duplex user equipment corresponding to an optimal or favorable evaluation value.

The mode selecting method according to the embodiment of the present invention may also be applied to communications mode selection between a multi-antenna full-duplex user equipment and other full-duplex user equipments in a cellular network, may also be applied to communications mode selection between a multi-antenna full-duplex user equipment and other half-duplex user equipments in a cellular network, may also be applied to communications mode selection between a multi-antenna full-duplex user equipment and other full-duplex user equipments and other half-duplex user equipments, or, may also be applied to the communications between a multi-antenna full-duplex user equipment and a base station and other user equipments on the same time-frequency resource at the same time. The implementation manner is the same as that in the foregoing embodiments, and is not described herein again.

Application Scenario 2: Radio Local Area Network

Figure 11:
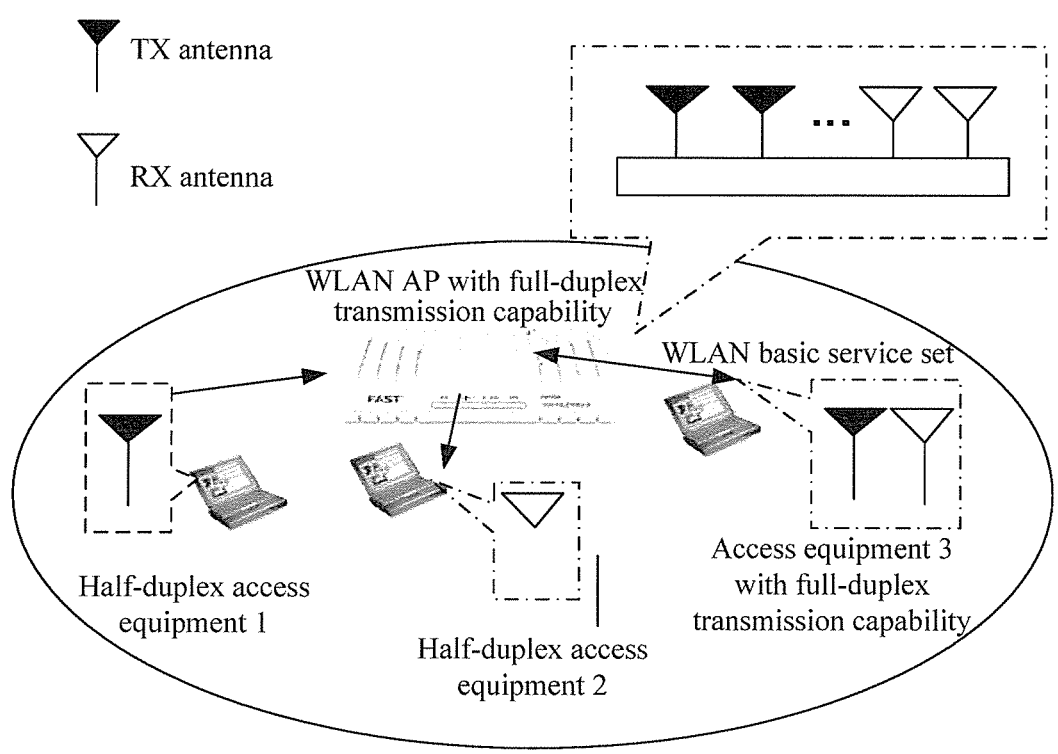
FIG. 11 is a schematic diagram of a scenario applied in a wireless local area network according to an embodiment of the present invention.

As shown in FIG. 11, if the embodiments of the present invention are applied to a radio local area network, the communications equipment 1 or the communications equipment 3 or the communications equipment A according to the embodiments of the present invention may be a multi-antenna access point (Access Point, AP) with the full-duplex transmission capacity in FIG. 11, such as a WLAN AP, a wireless router. The communications equipment 2 or the communications equipment 4 or the communications equipment B according to the embodiments of the present invention may be an access equipment 3 with the full-duplex transmission capacity, or the equipment set forming the communications equipment B may include a terminal 1, a terminal 2, and a terminal 3 in FIG. 11.

When the multi-antenna access point with the full-duplex transmission capacity communicates with the access equipment 3 with the full-duplex transmission capacity, system performance evaluation values in the half-duplex transmission mode and the full-duplex transmission mode are compared according to system performance optimization indexes such as a system capacity and a system transmit power; a transmission mode corresponding to the optimal or favorable system performance evaluation value is selected as a target transmission mode based on a comparison result; and data transmission between the multi-antenna access point and the access equipment 3 is performed based on the target transmission mode. For the full-duplex transmission mode, system performance evaluation values corresponding to all or part of antenna TX/RX combinations are calculated, and a transmission mode corresponding to the optimal or favorable system performance evaluation value is selected to perform transmission. Specifically, when the system performance evaluation values are calculated, a channel matrix or a converted channel matrix is divided, and two sub-matrices on a principal diagonal/counter diagonal are taken as two channel matrices in opposite transmission directions to calculate the system performance evaluation values corresponding to the antenna TX/RX combinations.

The multi-antenna access point with the full-duplex transmission capacity can also perform uplink and downlink transmission on the same time-frequency resources with a plurality of access equipments 1, 2, and 3. In this application scenario, not all the access equipments are required to have the full-duplex transmission capacity. As shown in FIG. 11, on the same time-frequency resource, the multi-antenna access point performs uplink transmission with the access equipment 1, performs downlink transmission with the access equipment 2, and performs uplink and downlink transmission at the same time with the access equipment 3. When selecting an uplink or downlink access equipment and/or selecting an antenna TX/RX combination of a full-duplex access terminal, considering that different access equipments form a combination, antennas of the access equipments are regarded to be on the same virtual equipment. Then according to a combined channel matrix formed by antennas of the access point and antennas of the access equipments, system performance evaluation values corresponding to uplink or downlink user equipment selecting modes and/or antenna TX/RX combinations of a full-duplex user equipment are calculated according to different matrix conversion and sub-matrix division. Data transmission is performed according to the uplink or downlink access equipment selection mode and/or the antenna TX/RX combinations of a full-duplex access equipment corresponding to an optimal or favorable evaluation value.

The mode selecting method according to the embodiment of the present invention may also be applied to communications mode selection between a multi-antenna full-duplex access equipment and other full-duplex access equipments in a radio local area network, may also be applied to communications mode selection between a multi-antenna full-duplex access equipment and other half-duplex access equipments in a radio local area network, may also be applied to communications mode selection between a multi-antenna full-duplex access equipment and other full-duplex access equipments in a radio local area network, or, may also be applied to the communications between a multi-antenna full-duplex access equipment and an access point and other access equipments on the same time-frequency resource at the same time. The basic method is the same as that in the embodiments, and is not described herein again.

It should be noted that, the expressions of the first, the second, the third, and the fourth used in the description of the embodiments are not intended to indicate a sequence. Instead, they are only used for the convenience of differentiation.

Various thresholds described in the foregoing embodiments may be flexibly configured based on experience or application scenarios, which is not specifically limited in the embodiments of the present invention.

It should be noted that, for brevity, the above method embodiments are represented as a series of actions. However, a person skilled in the art should understand that the present invention is not limited to the order of the described actions, because according to the present invention, some steps may adopt other order or occur simultaneously. It should be further understood by a person skilled in the art that the described embodiments all belong to exemplary embodiments, and the involved actions and modules are not necessarily required by the present invention.

In the foregoing embodiments, the description of each of the embodiments has respective focuses. For a part that is not described in detail in a certain embodiment, reference may be made to related descriptions in other embodiments.

A person of ordinary skill in the art may understand that all or a part of the steps of the method in the embodiments of the present invention may be implemented by a program instructing relevant hardware. The program may be stored in a computer readable storage medium, and the storage medium may include a read only memory, a random access memory, a magnetic disk or an optical disk or the like.

The virtualization processing method and relevant apparatuses, and a computer system provided in the embodiments of the present invention are described in detail in the foregoing. In this specification, specific examples are used for illustrating principle and implementation manners of the present invention. The foregoing descriptions about the embodiments of the present invention are merely used to help understand the method and core ideas of the present invention. Meanwhile a person of ordinary skill in the art may make modifications to the specific implementation manners and application scopes according to the idea of the present invention. In conclusion, the content of the specification shall not be construed as a limitation to the present invention.

What is claimed is:

1. A transmission mode selecting method in a radio communications system, the radio communications system comprising a first communications equipment and a second communications equipment, the first communications equipment comprising M antennas, the second communications equipment comprising N antennas, the method comprising:
    obtaining a first system capacity in a half-duplex transmission mode;
    obtaining a second system capacity in a full-duplex transmission mode, wherein the second system capacity is the maximum value among system capacities of a universal set of candidate antenna TX/RX combinations in the full-duplex transmission mode, or the maximum value among system capacities of a first subset of the candidate antenna TX/RX combinations in the full-duplex transmission mode, or a system capacity exceeding a system capacity threshold;
    selecting a target transmission mode according to a comparison result between the first system capacity and the second system capacity, wherein the target transmission mode is a transmission mode corresponding to a larger value between the first system capacity and the second system capacity; and
    when the target transmission mode is the full-duplex transmission mode:
        performing full-duplex data transmission in accordance with an antenna TX/RX combination corresponding to the second system capacity, wherein the antenna TX/RX combination corresponding to the second system capacity refers to a transmission mode of each antenna among the M antennas of the first communications equipment and a transmission mode of each antenna among the N antennas of the second communications equipment when the full-duplex transmission mode is used for transmission, and the transmission mode of the antenna is receiving signals or transmitting signals.

2. The method according to claim 1, wherein selecting a target transmission mode according to a comparison result between the first system capacity and the second system capacity, wherein the target transmission mode is a transmission mode corresponding to a larger value between the first system capacity and the second system capacity comprises:
    when the second system capacity is greater than the first system capacity, selecting the full-duplex transmission mode; and
    when the second system capacity is smaller than the first system capacity, selecting the half-duplex transmission mode.

3. The method according to claim 1, wherein the system capacity threshold is the first system capacity, or the system capacity threshold is the sum of the first system capacity and an adjustment value, or the system capacity threshold is an average system capacity or the highest system capacity in a full-duplex transmission mode in a history statistical period, or the system capacity threshold is an average system capacity or the highest system capacity in a half-duplex transmission mode in the history statistical period.

4. A transmission mode selecting method in a radio communications system, the radio communications system comprising a first communications equipment and a second communications equipment, the first communications equipment comprising M antennas, the second communications equipment comprising N antennas, the method comprising:
    obtaining a first system transmit power in a half-duplex transmission mode;
    obtaining a second system transmit power in a full-duplex transmission mode, wherein the second system transmit power is the minimum value among system transmit powers of a universal set of candidate antenna TX/RX combinations in the full-duplex transmission mode, or the minimum value among system transmit powers of a second subset of the candidate antenna TX/RX combinations in the full-duplex transmission mode, or a system transmit power smaller than a system transmit power threshold;
    selecting a target transmission mode according to a comparison result between the first system transmit power and the second system transmit power, wherein the target transmission mode is a transmission mode corresponding to a smaller value between the first system transmit power and the second system transmit power; and
    when the target transmission mode is the full-duplex transmission mode;
    performing full-duplex data transmission in accordance with an antenna TX/RX combination corresponding to the second system transmit power, wherein the antenna TX/RX combination corresponding to the second system transmit power refers to a transmission mode of each antenna among the M antennas of the first communications equipment and a transmission mode of each antenna among the N antennas of the second communications equipment when the full-duplex transmission mode is used for transmission, and the transmission mode of the antenna is receiving signals or transmitting signals.

5. The method according to claim 4, wherein selecting a target transmission mode according to a comparison result between the first system transmit power and the second system transmit power, wherein the target transmission mode is a transmission mode corresponding to a smaller value between the first system transmit power and the second system transmit power comprises:
    when the second system transmit power is smaller than the first system transmit power, selecting the full-duplex transmission mode; and
    when the second system transmit power is greater than the first system transmit power, selecting the half-duplex transmission mode.

6. The method according to claim 4, wherein the system transmit power threshold is the first system transmit power, or the system transmit power threshold is the difference between the first system transmit power and an adjustment value, or the system transmit power threshold is an average system transmit power or the lowest system transmit power in a full-duplex transmission mode in a history statistical period, or the system transmit power threshold is an average system transmit power or the lowest system transmit power in a half-duplex transmission mode in the history statistical period.

7. An antenna TX/RX combination determining method in a full-duplex transmission mode, the method comprising:
obtaining system performance evaluation values corresponding to a plurality of candidate antenna TX/RX combinations in the full-duplex transmission mode, wherein the plurality of candidate antenna TX/RX combinations is a universal set of candidate antenna TX/RX combinations in the full-duplex transmission mode, or a third subset of the universal set of candidate antenna TX/RX combinations in the full-duplex transmission mode;
selecting an optimal performance evaluation value among the system performance evaluation values corresponding to the plurality of candidate antenna TX/RX combinations, or, selecting a target performance evaluation value superior to a system performance threshold among the system performance evaluation values corresponding to the plurality of candidate antenna TX/RX combinations; and
determining a candidate antenna TX/RX combination corresponding to the optimal performance evaluation value or the target performance evaluation value as an adopted antenna TX/RX combination mode;
wherein obtaining system performance evaluation values corresponding to a plurality of candidate antenna TX/RX combinations in the full-duplex transmission mode comprises:
calculating system capacities corresponding to all candidate antenna TX/RX combinations in the full-duplex transmission mode, wherein all the candidate antenna TX/RX combinations in the full-duplex transmission mode form the universal set; or, within a first calculation period threshold, calculating system capacities corresponding to a plurality of candidate antenna TX/RX combinations in the full-duplex transmission mode, wherein the plurality of candidate antenna TX/RX combinations corresponding to which the system capacities are calculated in the full-duplex transmission mode within the first calculation period threshold forms the third subset;
selecting an optimal performance evaluation value among the system performance evaluation values corresponding to the plurality of candidate antenna TX/RX combinations, or, selecting a target performance evaluation value superior to a system performance threshold among the system performance evaluation values corresponding to the plurality of candidate antenna TX/RX combinations comprises:
selecting the maximum system capacity among the system capacities corresponding to the plurality of candidate antenna TX/RX combinations, or, selecting a target system capacity greater than a system capacity threshold among the system capacities corresponding to the plurality of candidate antenna TX/RX combinations; and
determining a candidate antenna TX/RX combination corresponding to the optimal performance evaluation value or the target performance evaluation value as an adopted antenna TX/RX combination mode comprises:
determining the candidate antenna TX/RX combination corresponding to the maximum system capacity or the target system capacity as the adopted antenna TX/RX combination mode.

8. An antenna TX/RX combination determining device in a full-duplex transmission mode, the device comprising:
a system performance evaluation value obtaining unit, configured to obtain system performance evaluation values corresponding to a plurality of candidate antenna TX/RX combinations in the full-duplex transmission mode, wherein the plurality of candidate antenna TX/RX combinations is a universal set of candidate antenna TX/RX combinations in the full-duplex transmission mode, or a third subset of the universal set of candidate antenna TX/RX combinations in the full-duplex transmission mode;
a selecting unit, configured to select an optimal performance evaluation value among the system performance evaluation values corresponding to the plurality of candidate antenna TX/RX combinations and output by the system performance evaluation value obtaining unit, or a target performance evaluation value superior to a system performance threshold among the system performance evaluation values corresponding to the plurality of candidate antenna TX/RX combinations; and
a determining unit, configured to determine a candidate antenna TX/RX combination corresponding to the optimal performance evaluation value or the target performance evaluation value as an adopted antenna TX/RX combination mode;
wherein the system performance evaluation value obtaining unit comprises a system capacity calculating unit configured to:
calculate system capacities corresponding to all candidate antenna TX/RX combinations in the full-duplex transmission mode, wherein all the candidate antenna TX/RX combinations in the full-duplex transmission mode form the universal set, or
within a first calculation period threshold, calculate system capacities corresponding to a plurality of candidate antenna TX/RX combinations in the full-duplex transmission mode, wherein the plurality of candidate antenna TX/RX combinations corresponding to which the system capacities are calculated in the full-duplex transmission mode within the first calculation period threshold forms the third subset;
the selecting unit is configured to select the maximum system capacity among the system capacities corresponding to the plurality of candidate antenna TX/RX combinations, or, select a target system capacity greater than a system capacity threshold among the system capacities corresponding to the plurality of candidate antenna TX/RX combinations; and
the determining unit is configured to determine a candidate antenna TX/RX combination corresponding to the maximum system capacity or the target system capacity as an adopted antenna TX/RX combination mode.

9. A transmission mode selecting device in a radio communications system, the radio communications system comprising a first communications equipment and a second communications equipment, the first communications equipment comprising M antennas, the second communications equipment comprising N antennas, the transmission mode selecting device comprising:

a processing device comprising at least one processor, the processing device configured to:
obtain a first system capacity in a half-duplex transmission mode;
obtain a second system capacity in a full-duplex transmission mode, wherein the second system capacity is the maximum value among system capacities of a universal set of candidate antenna TX/RX combinations in the full-duplex transmission mode, or the maximum value among system capacities of a first subset of the candidate antenna TX/RX combinations in the full-duplex transmission mode, or a system capacity exceeding a system capacity threshold;
select a target transmission mode according to a comparison result between the first system capacity and the second system capacity wherein the target transmission mode is a transmission mode corresponding to a larger value between the first system capacity and the second system capacity; and
when the target transmission mode is the full-duplex transmission mode, the processing device is further configured to:
perform full-duplex data transmission in accordance with an antenna TX/RX combination corresponding to the second system capacity, wherein the antenna TX/RX combination corresponding to the second system capacity refers to a transmission mode of each antenna among the M antennas of the first communications equipment and a transmission mode of each antenna among the N antennas of the second communications equipment when the full-duplex transmission mode is used for transmission, and the transmission mode of the antenna is receiving signals or transmitting signals.

10. The device according to claim 9, wherein the processing device is configured to:
when the second system capacity is greater than the first system capacity, select the full-duplex transmission mode; and
when the second system is smaller than the first system capacity, select the half-duplex transmission mode.

11. A transmission mode selecting device in a radio communications system, the radio communications system comprising a first communications equipment and a second communications equipment, the first communications equipment comprising M antennas, the second communications equipment comprising N antennas, the transmission mode selecting device comprising:
a processing device comprising at least one processor, the processing device configured to:
obtain a first system transmit power in a half-duplex transmission mode;
obtain a second system transmit power in a full-duplex transmission mode, wherein the second system transmit power is the minimum value among system transmit powers of a universal set of candidate antenna TX/RX combinations in the full-duplex transmission mode, or the minimum value among system transmit powers of a second subset of the candidate antenna TX/RX combinations in the full-duplex transmission mode, or a system transmit power smaller than a system transmit power threshold;
select a target transmission mode according to a comparison result between the first system transmit power and the second system transmit power, wherein the target transmission mode is a transmission mode corresponding to a smaller value between the first system transmit power and the second system transmit power; and
when the target transmission mode is the full-duplex transmission mode, the processing device is further configured to:
perform full-duplex data transmission in accordance with an antenna TX/RX combination corresponding to the second system transmit power, wherein the antenna TX/RX combination corresponding to the second system transmit power refers to a transmission mode of each antenna among the M antennas of the first communications equipment and a transmission mode of each antenna among the N antennas of the second communications equipment when the full-duplex transmission mode is used for transmission, and the transmission mode of the antenna is receiving signals or transmitting signals.

12. The device according claim 11, wherein the processing device is configured to:
when the second system transmit power is smaller than the first system transmit power, select the full-duplex transmission mode; and
when the second system transmit power is greater than the first system transmit power, select the half-duplex transmission mode.

13. A radio communications system, comprising:
a third communications equipment and a fourth communications equipment;
wherein the third communications equipment is configured to:
when needing to perform data transmission with a second communications equipment, obtain a first system transmit power in a half-duplex transmission mode,
obtain a second system transmit power in a full-duplex transmission mode, wherein the second system transmit power is the minimum value among system transmit powers of a universal set of candidate antenna TX/RX combinations in the full-duplex transmission mode, or the minimum value among system transmit powers of a second subset of the candidate antenna TX/RX combinations in the full-duplex transmission mode, or a system transmit power smaller than a system transmit power threshold; select a target transmission mode according to a comparison result between the first system transmit power and the second system transmit power, wherein the target transmission mode is a transmission mode corresponding to a smaller value between the first system transmit power and the second system transmit power, and
perform data transmission with the fourth communications equipment based on the target transmission mode; and
wherein the fourth communications equipment is configured to:
receive data which is transmitted from the third communications equipment based on the target transmission mode, and/or, transmit data to the third communications equipment; wherein:
when the target transmission mode is a full-duplex transmission mode, the third communications equipment is configured to perform full-duplex data transmission with the fourth communications equipment based on an antenna TX/RX combination corresponding to the second system transmit power, wherein the antenna TX/RX combination corresponding to the second system transmit power refers to a transmission mode of each antenna among M antennas on the third communications equipment, and a transmission mode of each antenna among N antennas on the fourth communications equipment when the full-duplex transmission mode is used for transmission, and the transmission mode of the antenna is receiving signals or transmitting signals.

14. The system according to claim 13, wherein the fourth communications equipment comprises communications equipment provided with a plurality of antennas, or a set of a plurality of communications equipment; and in the set of a plurality of communications equipment, each communications equipment is provided with one or more antennas.

15. A radio communications system, comprising:
a first communications equipment and a second communications equipment;
wherein the first communications equipment is configured to:
when needing to perform data transmission with the second communications equipment, obtain a first system capacity in a half-duplex transmission mode; obtain a second system capacity in a full-duplex transmission mode, wherein the second system capacity is the maximum value among system capacities of a universal set of candidate antenna TX/RX combinations in the full-duplex transmission mode, or the maximum value among system capacities of a first subset of the candidate antenna TX/RX combinations in the full-duplex transmission mode, or a system capacity exceeding a system capacity threshold,
select a target transmission mode according to a comparison result between the first system capacity and the second system capacity, wherein the target transmission mode is a transmission mode corresponding to a larger value between the first system capacity and the second system capacity, and
perform data transmission with the second communications equipment based on the target transmission mode; and
wherein the second communications equipment is configured to:
receive data which is transmitted from the first communications equipment based on the target transmission mode, and/or, transmit data to the first communications equipment; wherein:
the target transmission mode is the full-duplex transmission mode; and
the first communications equipment is configured to perform full-duplex data transmission with the second communications equipment based on an antenna TX/RX combination corresponding to the second system capacity, wherein the antenna TX/RX combination corresponding to the second system capacity refers to a transmission mode of each antenna among M antennas on the first communications equipment, and a transmission mode of each antenna among N antennas on the second communications equipment when the full-duplex transmission mode is used for transmission, and the transmission mode of the antenna is receiving signals or transmitting signals.

16. The system according to claim 15, wherein the second communications equipment comprises communications equipment provided with a plurality of antennas, or a set of a plurality of communications equipment; and in the set of a plurality of communications equipment, each communications equipment may be provided with one or more antennas.

* * * * *